United States Patent
Schygge et al.

(10) Patent No.: US 9,699,965 B2
(45) Date of Patent: Jul. 11, 2017

(54) ARTICULATED RIDING LAWN MOWER INCLUDING DISTRIBUTED BATTERY SYSTEM

(75) Inventors: Sebastian Schygge, Huskvarna (SE); Fredrik Östberg, Motala (SE); Pasi Viskari, Motala (SE)

(73) Assignee: HUSQVARNA AB, Huskvarna (SE)

( * ) Notice: Subject to any disclaimer, the term of this patent is extended or adjusted under 35 U.S.C. 154(b) by 48 days.

(21) Appl. No.: 14/232,318

(22) PCT Filed: Jul. 14, 2011

(86) PCT No.: PCT/US2011/044051
§ 371 (c)(1),
(2), (4) Date: Jan. 13, 2014

(87) PCT Pub. No.: WO2013/009322
PCT Pub. Date: Jan. 17, 2013

(65) Prior Publication Data
US 2014/0137528 A1    May 22, 2014

(51) Int. Cl.
| | | |
|---|---|---|
| *B60L 11/18* | (2006.01) |
| *A01D 69/02* | (2006.01) |
| *A01D 34/78* | (2006.01) |
| *B60K 1/04* | (2006.01) |

(Continued)

(52) U.S. Cl.
CPC ............ *A01D 34/78* (2013.01); *A01D 34/66* (2013.01); *A01D 69/02* (2013.01); *B60K 1/04* (2013.01); *B60L 11/1877* (2013.01); *B60K 2001/001* (2013.01); *B60K 2001/0411* (2013.01); *B60K 2001/0416* (2013.01); *B60K 2001/0444* (2013.01); *B60L 2200/40* (2013.01); *B60Y 2200/223* (2013.01)

(58) Field of Classification Search
USPC ................................................ 56/11.9, 320.1
See application file for complete search history.

(56) References Cited

U.S. PATENT DOCUMENTS

| | | | |
|---|---|---|---|
| 3,299,982 A | | 1/1967 | Bacon |
| 3,732,671 A | * | 5/1973 | Allen et al. ................. 56/10.2 R |
| 3,809,975 A | | 5/1974 | Bartels et al. |

(Continued)

FOREIGN PATENT DOCUMENTS

| | | |
|---|---|---|
| CN | 2805339 Y | 8/2006 |
| CN | 101444160 A | 6/2009 |

(Continued)

OTHER PUBLICATIONS

International Search Report and Written Opinion of PCT/US2011/044073 mailed Dec. 12, 2011, all enclosed pages.

(Continued)

*Primary Examiner* — Alicia Torres
(74) *Attorney, Agent, or Firm* — McNair Law Firm, P.A.

(57) ABSTRACT

A riding lawn mower may include a first frame portion, a second frame portion, an articulated joint and a battery system. The articulated joint may couple the first frame portion to the second frame portion. The battery system may include a first battery and a second battery. The first and second batteries may be electrically connected in series and collectively coupled to a load. The first battery may be mounted to the first frame portion and the second battery may be mounted to the second frame portion.

20 Claims, 21 Drawing Sheets

(51) Int. Cl.
*A01D 34/66* (2006.01)
*B60K 1/00* (2006.01)

(56) References Cited

U.S. PATENT DOCUMENTS

| | | | |
|---|---|---|---|
| 4,809,489 | A | 3/1989 | Johansson |
| 4,882,896 | A | 11/1989 | Wilcox et al. |
| 4,987,729 | A | 1/1991 | Paytas |
| 5,042,238 | A | 8/1991 | White, III et al. |
| 5,406,778 | A | 4/1995 | Lamb et al. |
| 5,442,901 | A | 8/1995 | Niemela et al. |
| 5,502,957 | A | 4/1996 | Robertson |
| 5,540,037 | A | 7/1996 | Lamb et al. |
| 5,564,721 | A | 10/1996 | Wians |
| 5,656,919 | A | 8/1997 | Proctor et al. |
| 5,718,534 | A | 2/1998 | Neuling |
| 5,790,355 | A | 8/1998 | Ishmael |
| 5,906,088 | A | 5/1999 | Inui et al. |
| 5,921,338 | A | 7/1999 | Edmondson |
| 6,012,272 | A * | 1/2000 | Dillon ............... 56/14.6 |
| 6,408,967 | B1 | 6/2002 | Huntsberger et al. |
| 6,591,593 | B1 | 7/2003 | Brandon et al. |
| 6,826,895 | B2 | 12/2004 | Iida et al. |
| 6,857,253 | B2 | 2/2005 | Reimers et al. |
| 7,594,377 | B1 | 9/2009 | Jansen et al. |
| 7,610,975 | B1 | 11/2009 | Gust et al. |
| 8,055,399 | B2 | 11/2011 | Wyatt et al. |
| 8,092,936 | B2 | 1/2012 | Xiankai et al. |
| 8,191,342 | B2 | 6/2012 | Ishii et al. |
| 8,521,384 | B2 | 8/2013 | O'Connor et al. |
| 8,572,939 | B2 | 11/2013 | Koike et al. |
| 2003/0005676 | A1 | 1/2003 | Martignon |
| 2003/0029149 | A1 | 2/2003 | Fillman et al. |
| 2004/0168420 | A1 | 9/2004 | Fillman et al. |
| 2005/0072132 | A1 | 4/2005 | Dettmann |
| 2005/0230168 | A1 | 10/2005 | Fillman et al. |
| 2006/0059879 | A1 | 3/2006 | Edmond |
| 2007/0095039 | A1 | 5/2007 | Carlson et al. |
| 2007/0125056 | A1 | 6/2007 | Edmond |
| 2008/0234096 | A1 | 9/2008 | Joshi et al. |
| 2008/0264026 | A1 | 10/2008 | Ishii et al. |
| 2009/0201650 | A1 | 8/2009 | Hauser et al. |
| 2010/0094496 | A1 | 4/2010 | Hershkovitz et al. |
| 2010/0326033 | A1 * | 12/2010 | Esmoris Bertoa ............ 56/17.5 |
| 2011/0155486 | A1 | 6/2011 | Iwaki et al. |
| 2012/0186887 | A1 | 7/2012 | Moriguchi et al. |
| 2012/0229085 | A1 * | 9/2012 | Lau ................. B60L 11/1818 320/109 |
| 2013/0104509 | A1 | 5/2013 | MacKinnon et al. |
| 2013/0167495 | A1 | 7/2013 | Borinato |
| 2014/0165524 | A1 | 6/2014 | Schygge et al. |

FOREIGN PATENT DOCUMENTS

| | | |
|---|---|---|
| CN | 101521265 A | 9/2009 |
| CN | 101861781 A | 10/2010 |
| CN | 102007856 A | 4/2011 |
| EP | 1645456 A2 | 4/2006 |
| EP | 1714822 A2 | 10/2006 |
| EP | 1985487 A2 | 10/2008 |
| EP | 2055523 A2 | 5/2009 |
| JP | 10191743 A2 | 7/1998 |
| WO | 2010118703 A1 | 10/2010 |

OTHER PUBLICATIONS

International Search Report and Written Opinion of PCT/US2011/044071 mailed Dec. 13, 2011, all enclosed pages.
International Search Report and Written Opinion of PCT/US2011/043964 mailed Dec. 13, 2011, all enclosed pages.
International Search Report and Written Opinion of PCT/US2011/044059 mailed Dec. 13, 2011, all enclosed pages.
International Search Report and Written Opinion of PCT/US2011/044051 mailed Dec. 14, 2011, all enclosed pages.
International Preliminary Report in the International Application Number Patentability of PCT/US2011/044051 issued Jan. 14, 2014.
Search Report in corresponding European application No. 11869255.7 mailed Sep. 8, 2015.
"Toyota Supra mkiv, Torsen Differential," Accessed at http://web.archive.org/web/20140314205710/http://mkiv.supras.org.nz/articles/torsen.htm, accessed on Dec. 28, 2000, pp. 8.

* cited by examiner

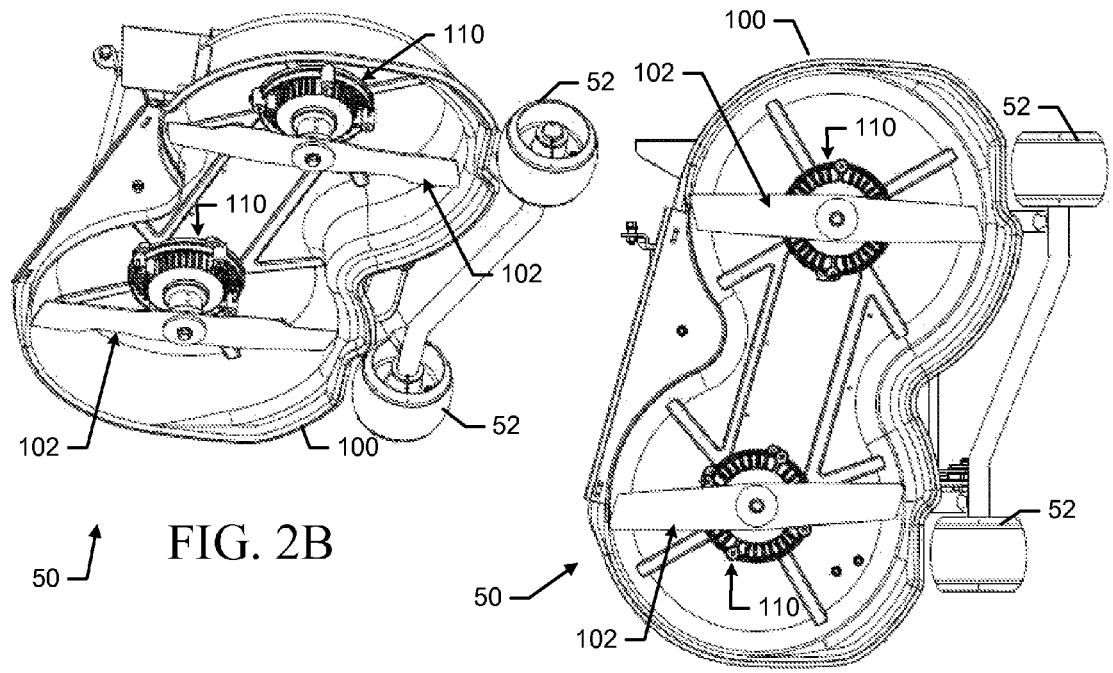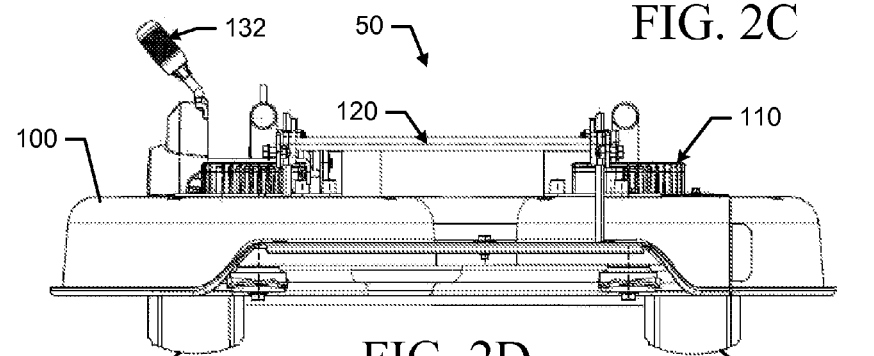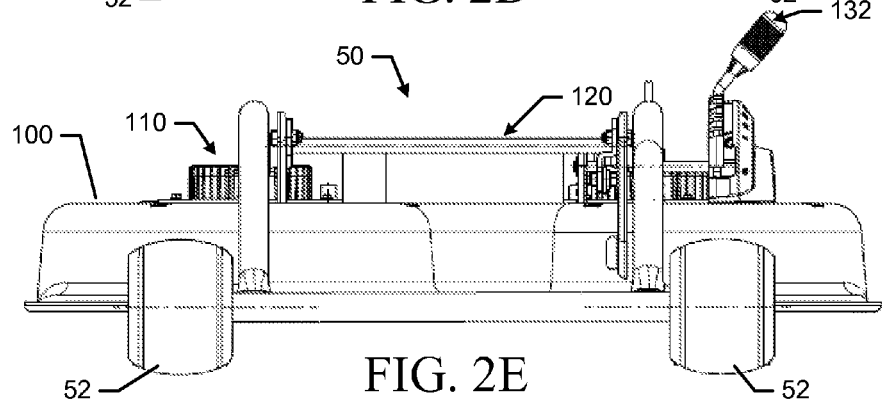

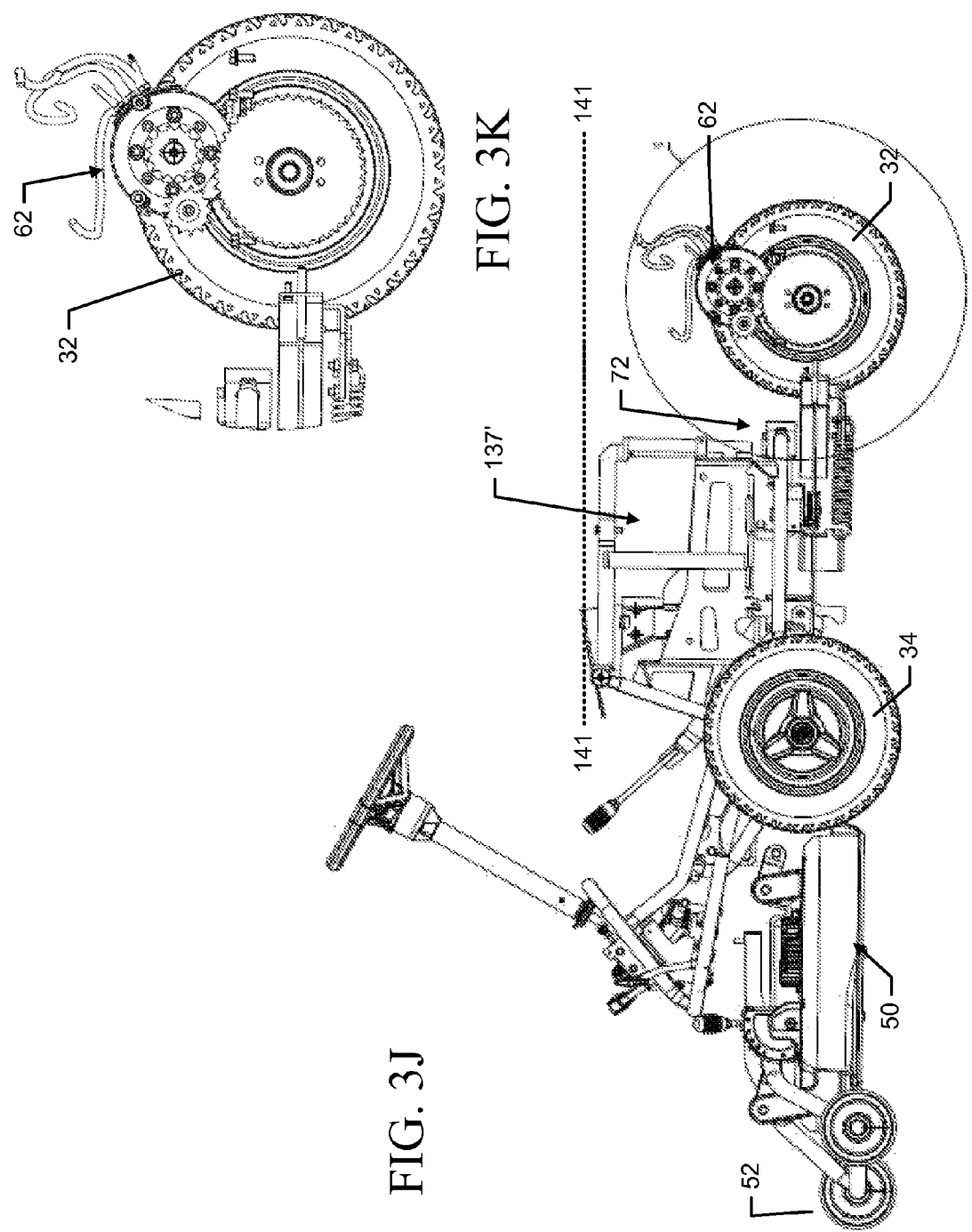

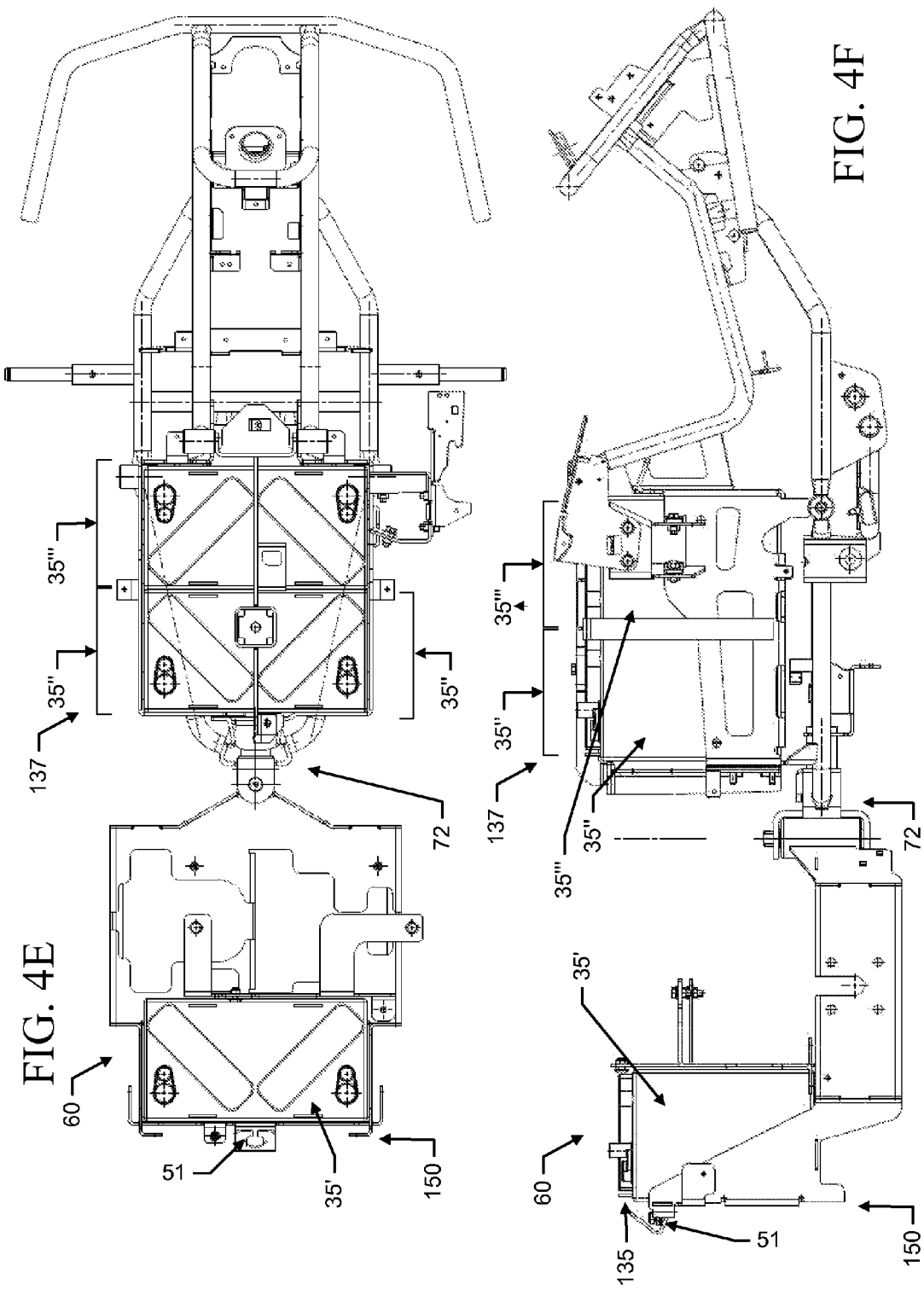

ARTICULATED RIDING LAWN MOWER INCLUDING DISTRIBUTED BATTERY SYSTEM

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large and typically have larger engines. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Riding lawn mowers are currently powered by gas-fueled combustion engines. Gas-powered engines require the purchase and storage of the gasoline or other fuel. They typically also require replacement of engine oil, spark plugs, and/or the like to ensure proper maintenance of the gas-powered engine. Moreover, gas-powered engines can be loud, can create a high amount of vibration, and produce emissions.

BRIEF SUMMARY OF SOME EXAMPLES

Accordingly, some example embodiments provide for a wholly battery-powered riding lawn mower. In some embodiments, the battery-powered riding lawn mower includes a battery system where one portion of the battery system (e.g., a battery) is disposed in one compartment while at least another portion of the battery system (e.g., one or more batteries) is located in another compartment. Moreover, the compartments may be joined together by an articulated joint.

In an example embodiment, a riding lawn mower is provided that may include a first frame portion, a second frame portion, an articulated joint and a battery system. The articulated joint may couple the first frame portion to the second frame portion. The battery system may include a first battery and a second battery. The first and second batteries may be electrically connected in series and collectively coupled to a load. The first battery may be mounted to the first frame portion and the second battery may be mounted to the second frame portion.

In one example embodiment, a riding lawn mower is provided and may include a frame, a first compartment, a drive motor compartment, and a battery system. The battery system may include a first battery and a second battery connected in series and collectively coupled in parallel to a load. The first battery may be mounted to the first compartment so that the weight of the first battery is substantially located in the first compartment, and the second battery may be mounted to the drive motor compartment so that the weight of the second battery is substantially located in the second compartment.

In another example embodiment, a riding lawn mower may include a frame and battery system. The frame may include a first location and a second location, the second location being separate from the first location. The battery system may include a first battery and a second battery, whereby the first and second batteries may be connected in series and collectively coupled in parallel to a load. The first battery may be mounted to the frame at the first portion so that weight of the first battery may be substantially disposed at the first location of the frame, and the second battery may be mounted to the frame relative to the rear axle so that weight of the second battery may be substantially disposed at the second location of the frame.

In another example embodiment, a battery system of a riding lawn mower may include a first battery mountable to a frame of the riding lawn mower and a second battery mountable to the frame of the riding lawn mower. The first and second batteries may be electrically connected in series and collectively coupled in parallel to a load of the riding lawn mower. The first battery may be configured to be mounted to a first compartment of the riding lawn mower so that the weight of the first battery may be substantially located in the first compartment. The second battery may be mounted to a drive motor compartment of the riding lawn mower so that the weight of the second battery may be substantially located in the second compartment.

Some example embodiments may improve the efficiency of riding lawn mowers as well as lower the costs of operation thereof.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 2B illustrates a bottom perspective view of the cutting deck of FIG. 2A according to an example embodiment;

FIG. 2C illustrates a bottom view of the cutting deck of FIG. 2A according to an example embodiment;

FIG. 2D illustrates a back view of the cutting deck of FIG. 2A according to an example embodiment;

FIG. 2E illustrates a front view of the cutting deck of FIG. 2A according to an example embodiment;

FIG. 3J illustrates a side view of the riding lawn mower of FIG. 3H and illustrating a side cross-sectional view of the drive motor compartment according to an example embodiment;

FIG. 3K illustrates the side cross-sectional view of the drive motor compartment of FIG. 3J according to an example embodiment;

FIG. 4E illustrates a top view of the riding lawn mower of FIG. 1B with the housing, wheels, axle and other components removed so that the battery locations can be illustrated according to an example embodiment;

FIG. 4F illustrates a side view of the riding lawn mower of FIG. 1A with the housing, wheels, axle and other components removed so that the battery locations can be illustrated according to an example embodiment;

DETAILED DESCRIPTION

Figure 1A:
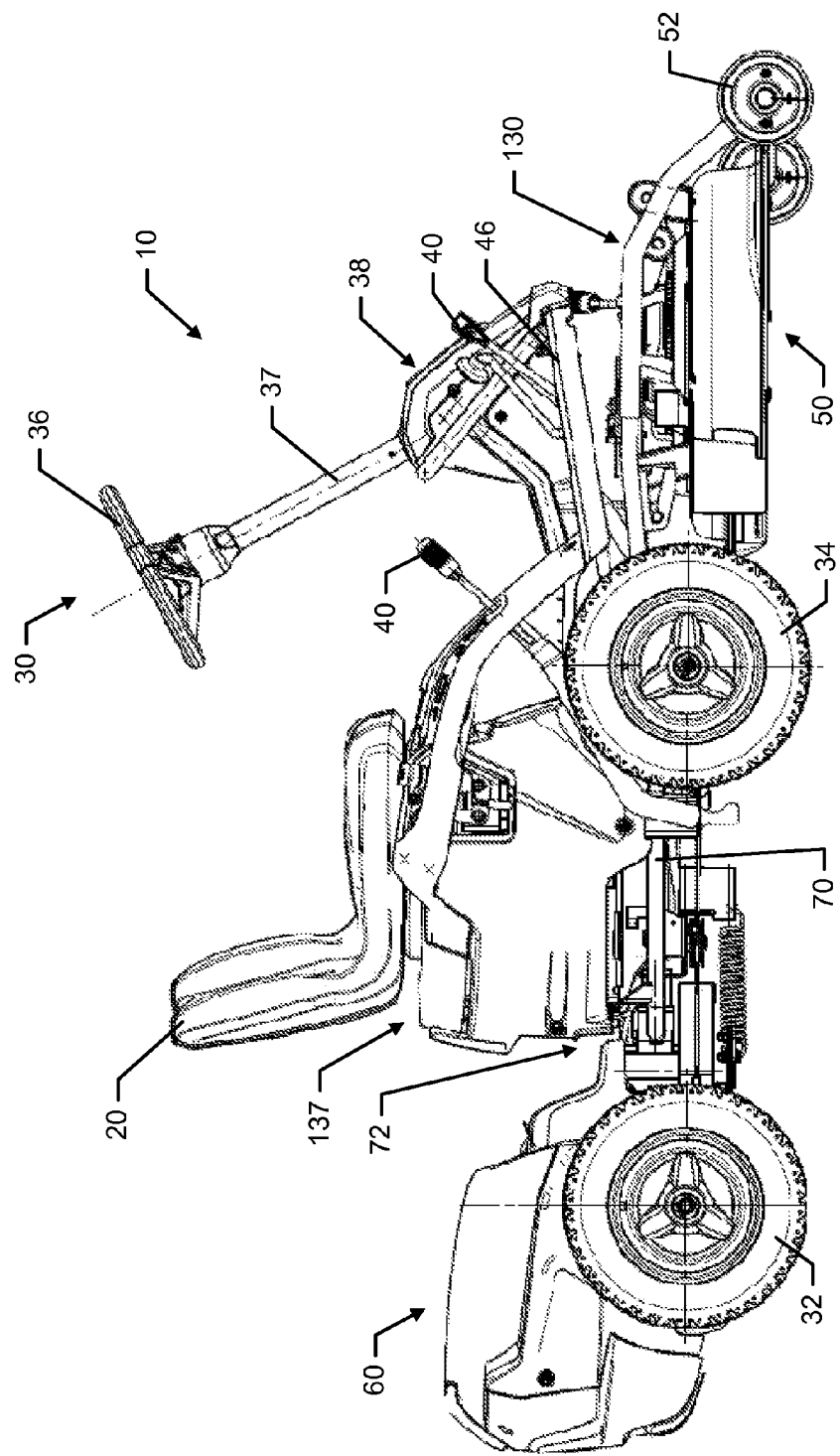
FIG. 1A illustrates a side view of a riding lawn mower according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the efficiency of riding lawn mowers as well as lower the costs of operation and maintenance thereof and provide a better customer experience. Embodiments of the invention relate to a battery powered riding lawn mower where the drive motor which drives the wheels of the battery powered riding lawn mower is powered fully by a battery system. Additionally, in one embodiment, the battery powered riding lawn mower includes a cutting deck which also may be fully powered by the battery system that powers the drive motor. When the drive motor is powered, the drive motor may operate a differential which may allow the wheels (that are disposed at each end of an axle) to operate at different speeds so that one wheel may rotate about the axle at one speed while the other wheel may rotate about the axle at a different speed. Embodiments of the battery powered riding lawn mower are described in more depth below with reference to FIGS. 1-7 and the related descriptions.

Figure 1B:
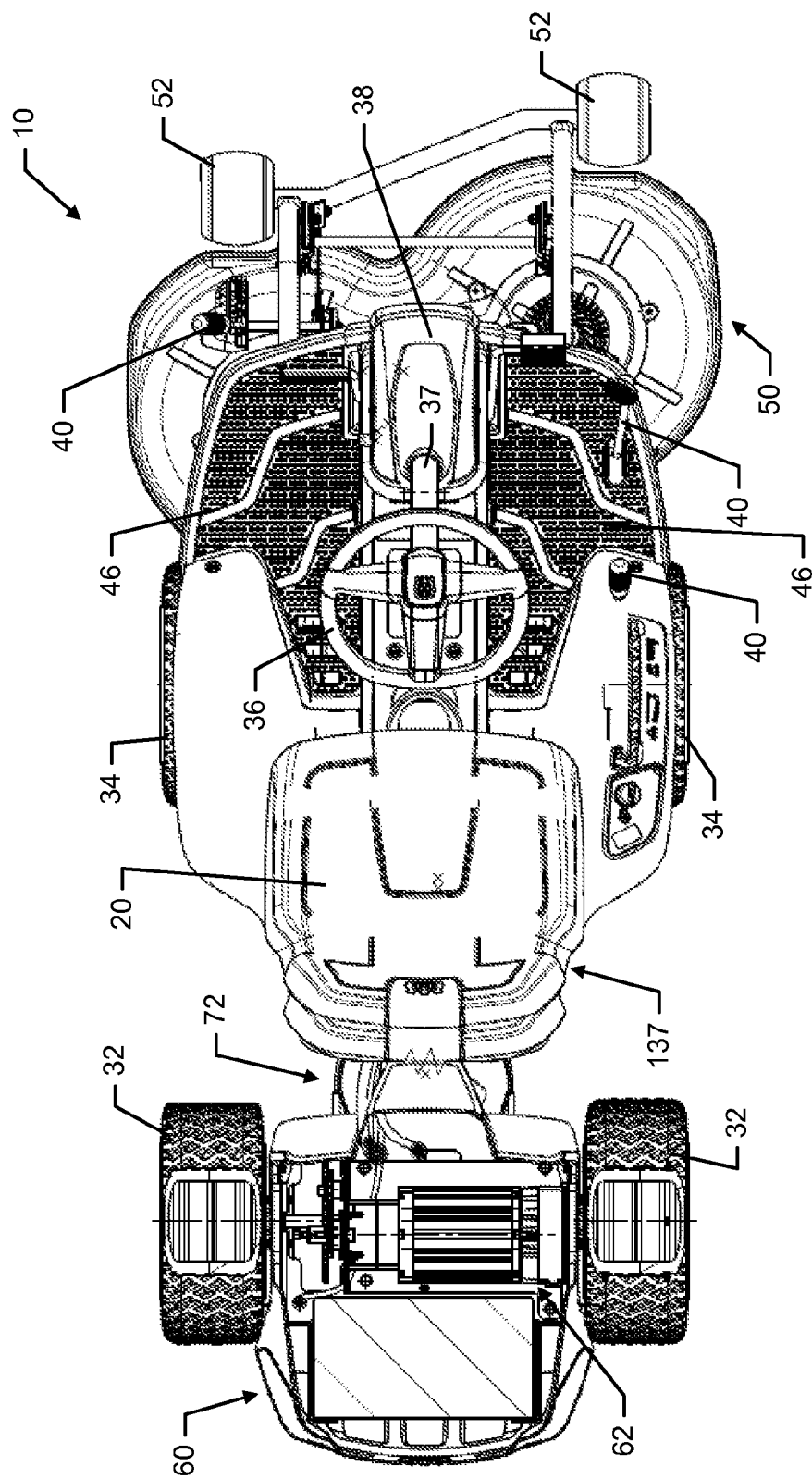
FIG. 1B illustrates a top view of the riding lawn mower according to an example embodiment.

FIG. 1, which includes FIGS. 1A and 1B, illustrates a battery powered battery powered riding lawn mower 10 according to an example embodiment. In this regard, FIG. 1A illustrates a side view of the battery powered riding lawn mower 10 according to an example embodiment, and FIG. 1B illustrates a top view of the battery powered riding lawn mower 10 according to an example embodiment. In some embodiments, the battery powered riding lawn mower 10 may include seat 20 that may be disposed at a center, rear or front portion of the battery powered riding lawn mower 10. The battery powered riding lawn mower 10 may also include a steering assembly 30 (e.g., a steering wheel, handle bars, or the like) functionally connected to the wheels of the battery powered riding lawn mower 10 to which steering inputs are provided. In some cases, the steering inputs may be provided to rear wheels 32 of the battery powered riding lawn mower 10 to allow the operator to steer the battery powered riding lawn mower 10. Since a steering control is provided to the rear wheels 32, the front wheels 34 may not receive steering inputs in some embodiments. The operator may sit on the seat 20, which may be disposed to the rear of the steering assembly 30 to provide input for steering of the battery powered riding lawn mower 10 via the steering assembly 30.

In an example embodiment, the steering assembly 30 may include a steering wheel 36 and a steering column 37. The steering column 37 may operably connect to additional steering assembly components described in greater detail below. Moreover, in some embodiments, the steering column 37 may extend into a steering console 38, which may provide a cover to improve the aesthetic appearance of the battery powered riding lawn mower 10 by obscuring the view of various mechanical components associated with the steering assembly 30. The battery powered riding lawn mower 10 may also include additional control related components 40 such as one or more speed controllers, cutting height adjusters and/or cutting unit lifting controllers. Some of these controllers may be provided in the form of foot pedals that may sit proximate to a footrest 46 (which may include a portion on both sides of the battery powered riding lawn mower 10 (e.g., on opposite sides of the steering console 38)) to enable the operator to rest his or her feet thereon while seated in the seat 20.

In some example embodiments, the steering assembly 30 may be embodied as an assembly of metallic or other rigid components that may be welded, fitted, bolted or otherwise operably coupled to each other and coupled to the wheels (rear wheels 32 in this example) of the battery powered riding lawn mower 10 to which steering inputs are provided. For example, the steering assembly 30 may include or otherwise be coupled with a steering cable assembly or a system of mechanical linkages to translate rotational motion applied to the steering assembly 30 (and more particularly to the steering wheel 36) into directional inputs to orient the wheels (e.g., rear wheels 32) accordingly. In the illustrated embodiment, the riding lawn mower has an articulated frame 70 where the front wheels 34 are rotatably mounted to a front frame portion and the rear wheels 32 are rotatably mounted to a rear frame portion. The rear frame portion and the front frame portion are joined at articulated joint 72 so that the rear frame portion can pivot with respect to the front frame portion in response to steering input in order to reorient the rear wheels 32 relative to the front wheels 34. Other steering control systems may be employed in some alternative embodiments.

The battery powered riding lawn mower 10 may also include, or be configured to support attachment of, a cutting deck 50 having at least one cutting blade mounted therein. FIG. 2, as discussed later, illustrates portions of the cutting deck 50 according to example embodiments. The cutting deck 50 may be a removable attachment that may be positioned in front of the front wheels 34 in a position to enable the operator to cut grass using the cutting blade when the cutting blade is rotated below the cutting deck 50 and the cutting deck 50 is in a cutting position. When operating to cut grass, the grass clippings may be captured by a collection system, mulched, or expelled from the cutting deck 50 via either a side discharge or a rear discharge.

In some embodiments, the cutting deck 50 may be elevated or lifted out of direct contact with the ground via a cutting unit lifting controller. In this regard, the cutting unit lifting controller may be a foot pedal or hand operated lever that operates linkages to lift or tilt the cutting deck 50 upward. Lifting the cutting deck 50 may enable the battery powered riding lawn mower 10 to traverse certain rough terrain or obstacles (e.g., small rocks, curbs, or other features) or may otherwise be preferable for some operators when in a transit mode, or when the battery powered riding lawn mower 10 is not actively being used in a cutting operation. However, other embodiments may not include any such cutting deck 50 lifting option, but may simply allow the height of blades within the cutting deck 50 to be adjusted using a cutting height adjuster (e.g., adjuster 132 in FIG. 2). In this regard, the cutting height adjuster may be a lever that is operably connected to the blades via linkages to adjust the height of the blades relative to the ground when the cutting deck 50 is lowered into a cutting position. In some embodiments, the cutting deck 50 itself may include wheels 52 to help ensure that the cutting deck 50 stays relatively level during operation to provide an even cut.

In embodiments in which the cutting deck 50 is removable, the cutting deck 50 may include blade drive components (e.g., belts, pulleys, chains, a blade motor or other components) that may be used to functionally operate the cutting deck 50 during a cutting operation. The cutting deck 50 may mate with a portion of the battery powered riding lawn mower 10 via a cutting deck mounting assembly configured to mate with the battery powered riding lawn mower 10 to join the cutting deck 50 to the battery powered riding lawn mower 10 to enable use of the cutting deck 50. FIG. 1 illustrates the battery powered riding lawn mower 10 with the cutting deck 50 attached.

In the pictured example embodiment of FIG. 1, drive motor compartment 60 of the battery powered riding lawn mower 10 is disposed to the rear of the operator's seat 20 to house various components of the battery powered riding lawn mower 10 including an electric drive motor 62. However, in other example embodiments, the drive motor compartment 60 could be in different positions such as in front of the seat 20 or below the seat 20. In some embodiments, the electric drive motor 62 may be operably coupled to one or more of the wheels of the battery powered riding lawn mower 10 (the rear wheels 32 in this example) in order to provide drive power for the battery powered riding lawn mower 10. Although the electric drive motor 62 may be capable of powering the rear wheels 32, in other alternative embodiments, the electric drive motor 62 may power all four wheels of the battery powered riding lawn mower 10 (e.g., in cases where the battery powered riding lawn mower 10 is not articulated). Moreover, in some cases, the electric drive motor 62 may manually or automatically shift between powering either two wheels or all four wheels of the battery powered riding lawn mower 10.

In an example embodiment, the electric drive motor 62, the steering assembly 30, the cutting deck 50, the seat 20 and other components of the battery powered riding lawn mower 10 may be operably connected (directly or indirectly) to a frame 70 of the battery powered riding lawn mower 10. The frame 70 may be a rigid structure configured to provide support, connectivity and interoperability functions for various ones of the components of the battery powered riding lawn mower 10. In some embodiments, the frame 70 may be split or articulated such that, for example, the front wheels 34 are disposed on an opposite portion of the frame 70 than the portion of the frame on which the back wheels 32 are disposed with respect to an articulated joint 72 in the frame 70.

The battery powered riding lawn mower 10 may also include a battery power source 74. The battery power source 74 may include one or more batteries that may provide power for all electrical components of the battery powered riding lawn mower 10. In cases in which multiple batteries are combined to form the battery power source 74, the batteries may be distributed or located near one another. In an example embodiment, three twelve volt batteries may be employed connected in series and their locations may be distributed throughout the battery powered riding lawn mower 10. For example, as will be discussed later with regard to FIGS. 4E-F, one or more batteries 35' may be disposed in the drive motor compartment 60, while other batteries 35", 35'" may be disposed under the seat 20 or in other locations of the battery powered riding lawn mower 10. In the illustrated embodiment of the invention, where the riding lawn mower 10 has an articulated frame 70 comprising a forward frame portion connected to a rearward frame portion via a an articulated joint 72, two batteries 35", 35'" are mounted to the forward frame portion between the front axle and the articulated joint 72, and one battery is mounted to the rearward frame portion rearward of the articulated joint 72 and just aft of the electric drive motor 62 and the rear axle. Since the batteries may account for a significant percentage of the weight of riding lawn mower 10, placement of the batteries significantly affects balance, rollover tendencies, wheel traction, center of gravity, handling, ease of steering, etc. As is discussed in more depth later, FIGS. 3A-3L illustrate various views of the exemplary battery powered riding lawn mower 10.

Figure 2A:
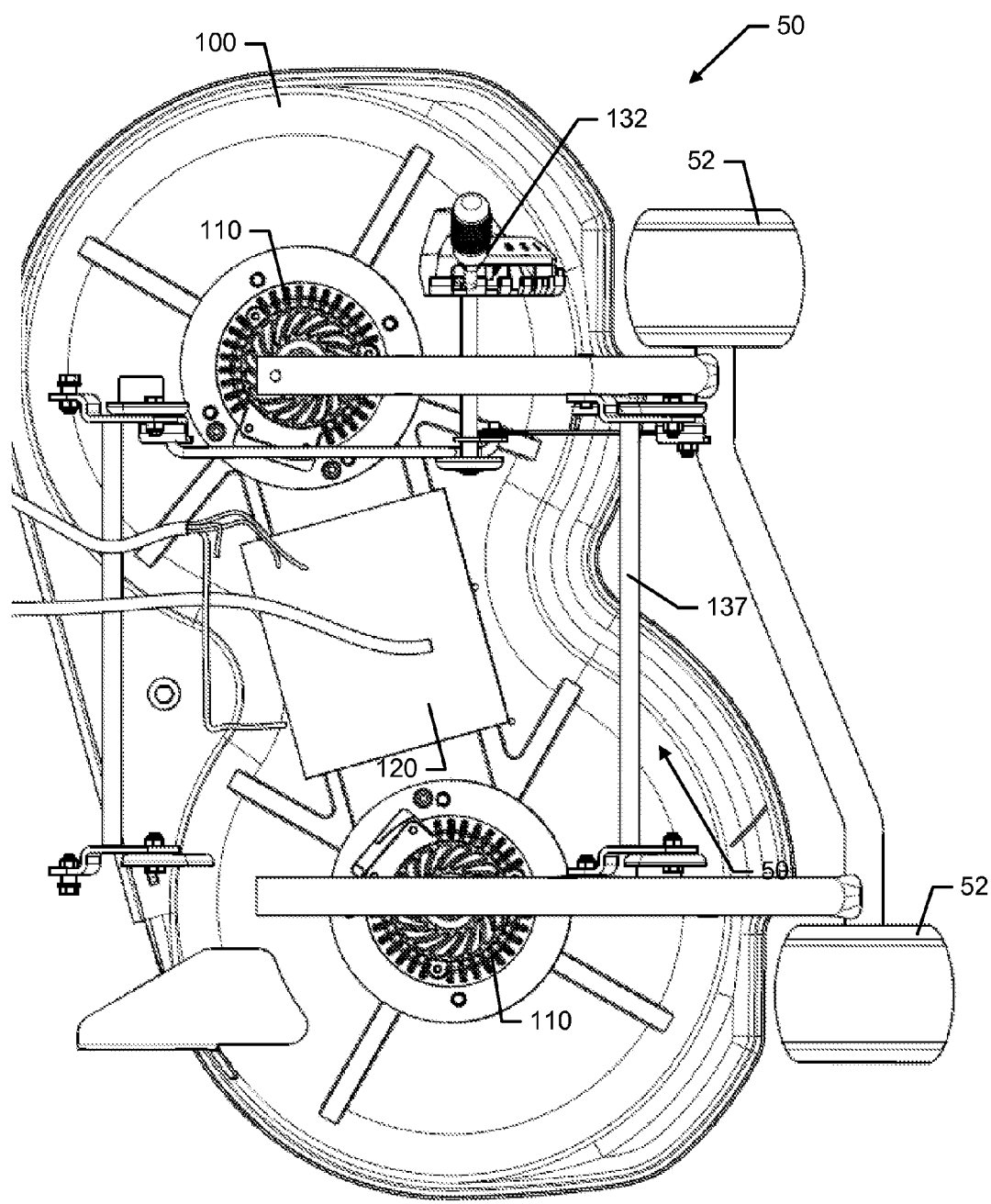
FIG. 2A illustrates a top view of a cutting deck of a riding lawn mower according to an example embodiment.
Figure 2G:
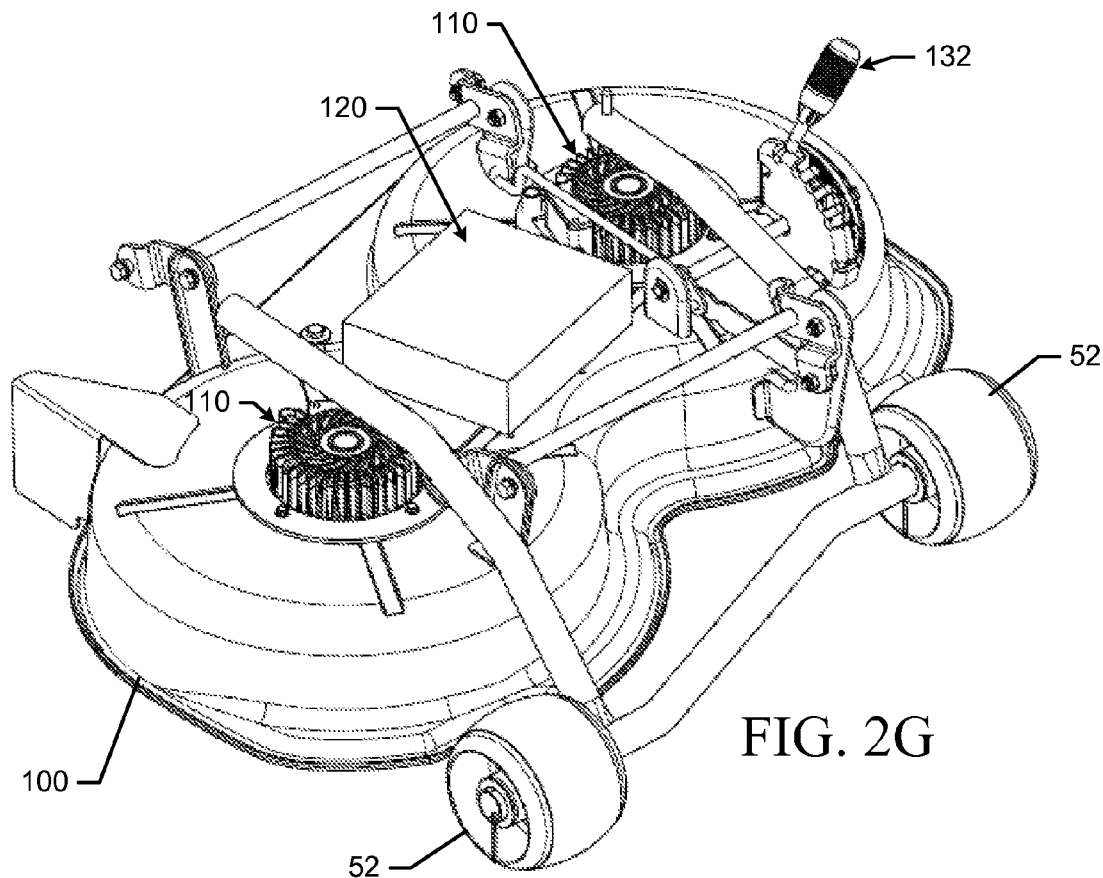
FIG. 2G illustrates a top perspective view of the cutting deck of FIG. 2A according to an example embodiment.
Figure 2F:
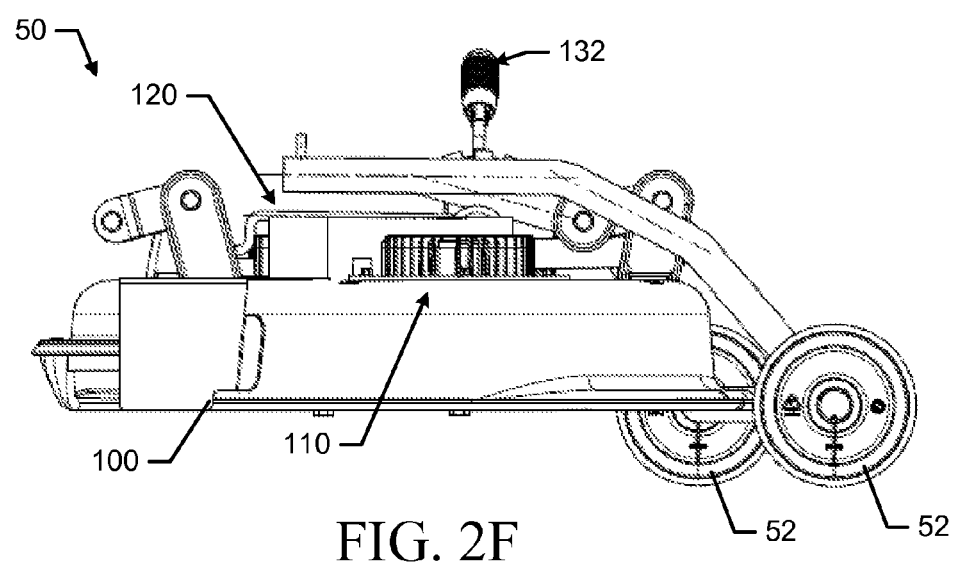
FIG. 2F illustrates a side view of the cutting deck of FIG. 2A according to an example embodiment.

Referring now to FIG. 2, which includes FIGS. 2A-2G, the cutting deck 50 (viewed from above in FIG. 2A) may include a blade housing 100, that may house one or more cutting blades 102 (show in FIGS. 2B and 2C). The cutting blades 102 may turn responsive to rotary motive forces applied by corresponding one or more blade drive motors 110. In some examples, there may be one blade motor provided for each cutting blade 102. However, other embodiments could use a single blade motor to turn multiple blades.

In the example of FIG. 2, there are two blade drive motors 110 shown for turning two corresponding cutting blades 102 within the blade housing, but other embodiments may employ less or more blades and corresponding blade motors. As illustrated in FIG. 2, each blade motor may be mounted to the cutting deck so that the shaft extending from the electric motor is oriented perpendicularly to the cutting deck. The blade is then attached directly to this shaft extending vertically outward from the cutting blade motor. The blade motors 110 may be controlled via one or more blade motor controllers 120. In some examples, the blade motor controllers 120 may be disposed substantially between the blade motors 110 and may receive power from the battery. In the illustrated embodiment, where a different electric motor controls each of the two cutting blades and the drive system, the controllers may electrically control each blade and the drive system independently without necessarily affecting the operation of the other blade(s) and/or drive system, as the case may be.

A cutting deck mounting assembly 130 may be provided for attachment of the cutting deck 50 to the frame of the battery powered riding lawn mower 10. The cutting deck mounting assembly 130 may suspend the blade housing (and therefore also the cutting blades 102) relative to the ground. In some embodiments, the cutting deck mounting assembly 130 may be supported by the wheels 52 of the cutting deck 50 and/or by attachment to the battery powered riding lawn mower 10. In an example embodiment, adjuster 132 may be utilized to change the height of the cutting blades 102 via adjustment of the distance between the cutting deck mounting assembly 130 and the blade housing 100.

As mentioned previously, FIG. 2A illustrates a top view of the cutting deck 50. Similarly, FIGS. 2B-2G illustrate various views of the cutting deck of FIG. 2A. Each of these views illustrates components previously discussed above with respect to the description of FIG. 2A. Additionally, as briefly mentioned above, FIGS. 1A and 1B illustrate side and top views of the battery powered riding lawn mower 10.

Figure 3A:
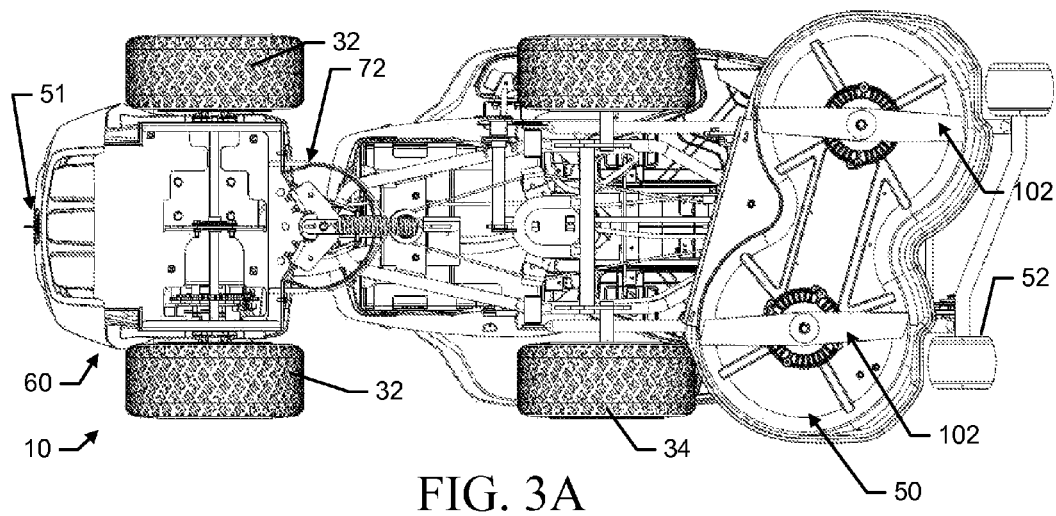
FIG. 3A illustrates a bottom view of a riding lawn mower according to an example embodiment.
Figures 3B, 3C:
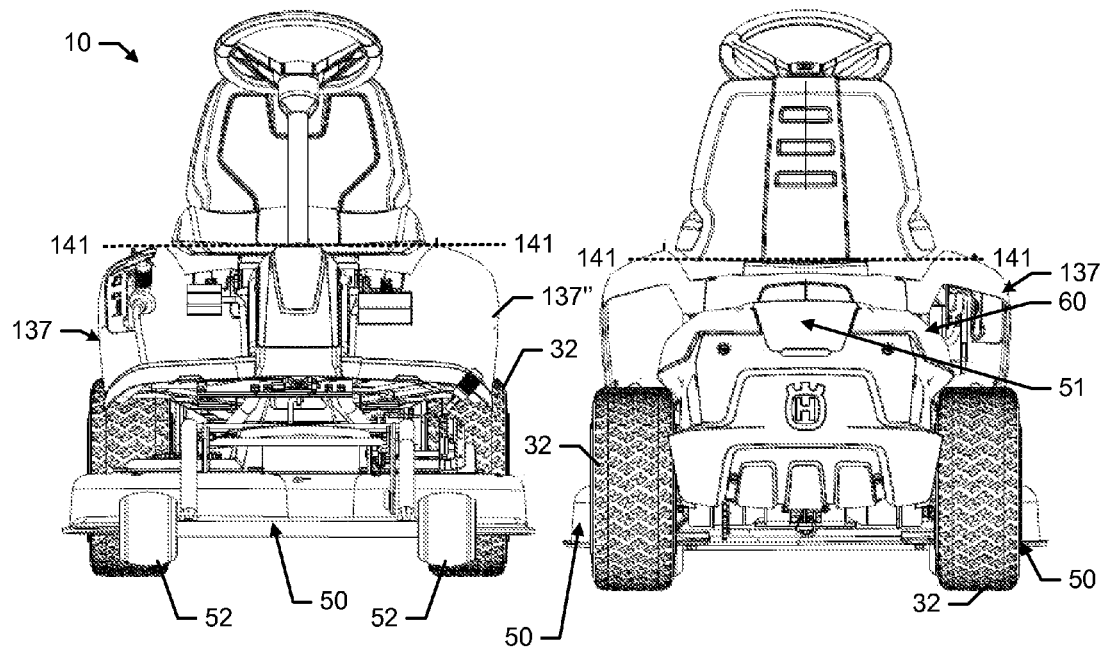
FIG. 3B illustrates a front view of the riding lawn mower of FIG. 3A according to an example embodiment.
FIG. 3C illustrates a back view of the riding lawn mower of FIG. 3A according to an example embodiment.
Figure 3D:
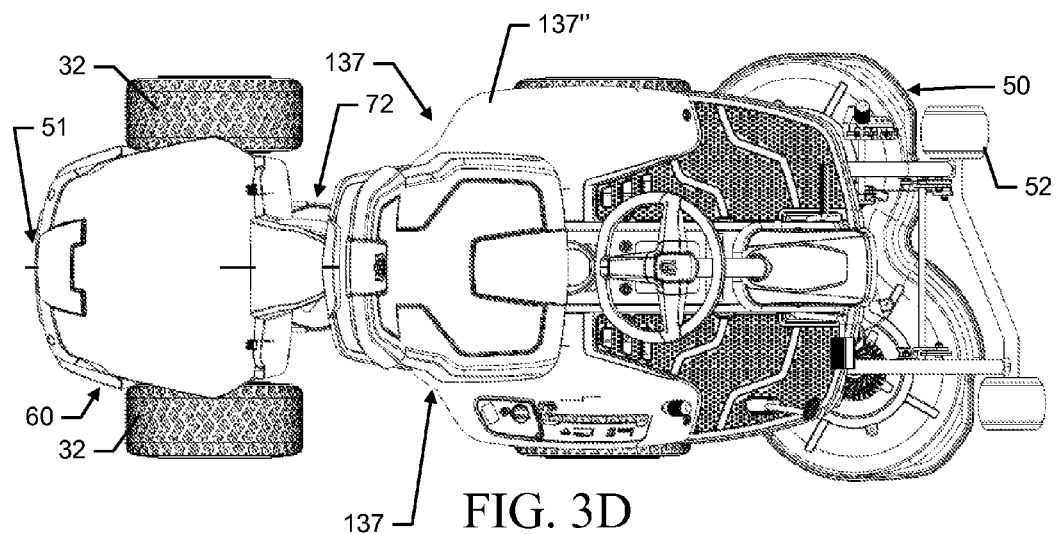
FIG. 3D illustrates a top view of the riding lawn mower of FIG. 3A according to an example embodiment.
Figure 3E:
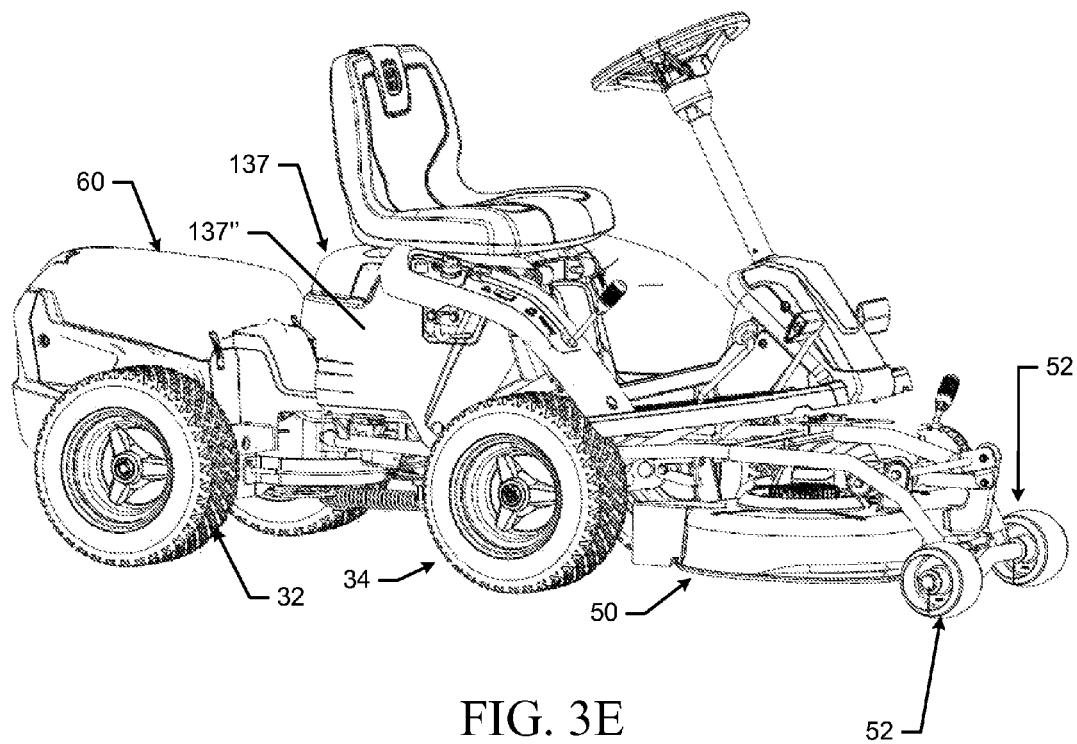
FIG. 3E illustrates a perspective view of the riding lawn mower of FIG. 3A according to an example embodiment.
Figure 3F:
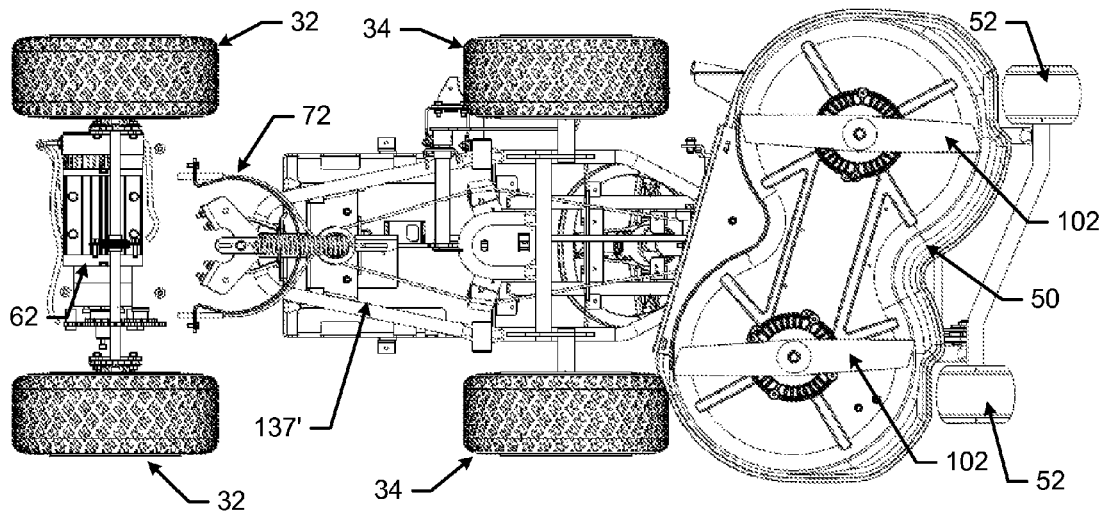
FIG. 3F illustrates a bottom view of the riding lawn mower of FIG. 3A according to an example embodiment.
Figure 3G:
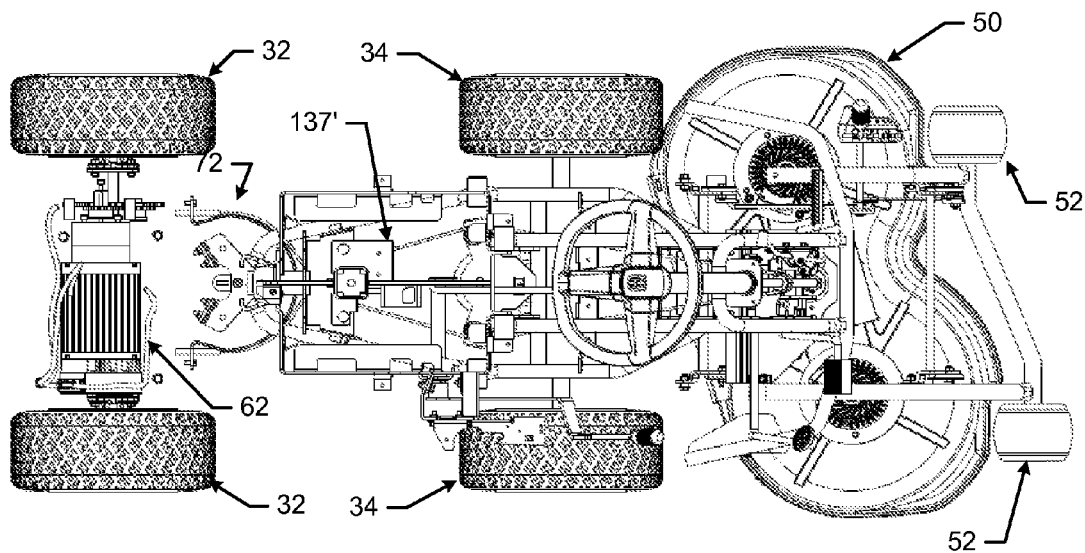
FIG. 3G illustrates a top view of the riding lawn mower of FIG. 3A according to an example embodiment.
Figure 3H:
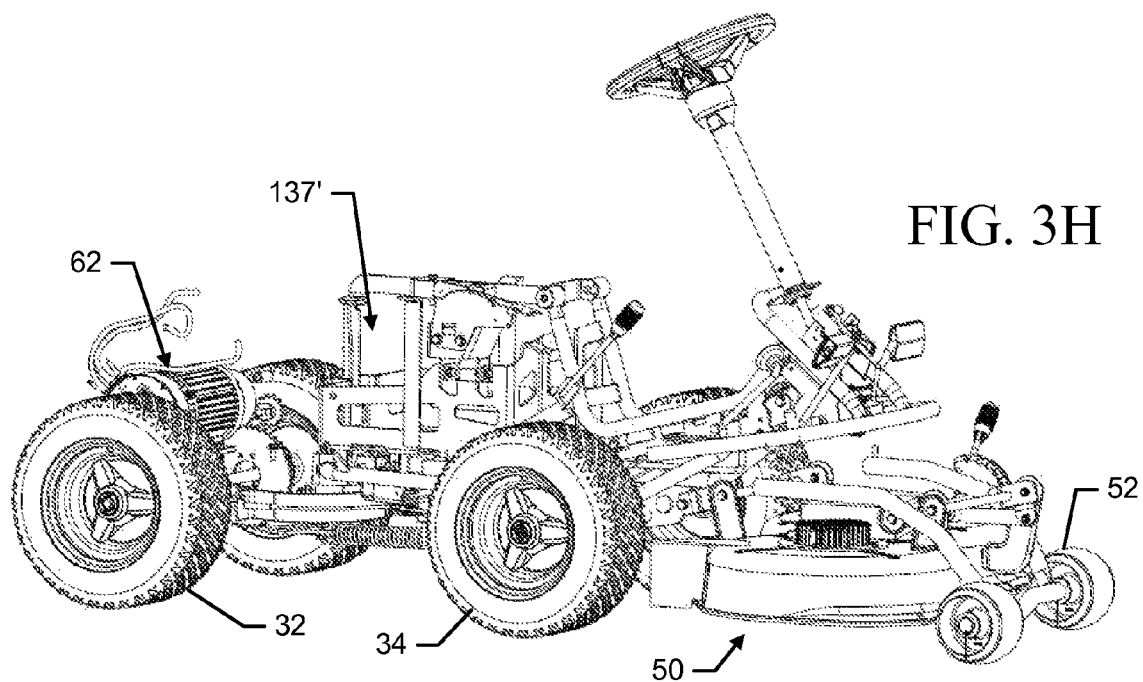
FIG. 3H illustrates a perspective view of the riding lawn mower of FIG. 3A with at least part of the housing and/or other components removed according to an example embodiment.
Figure 3I:
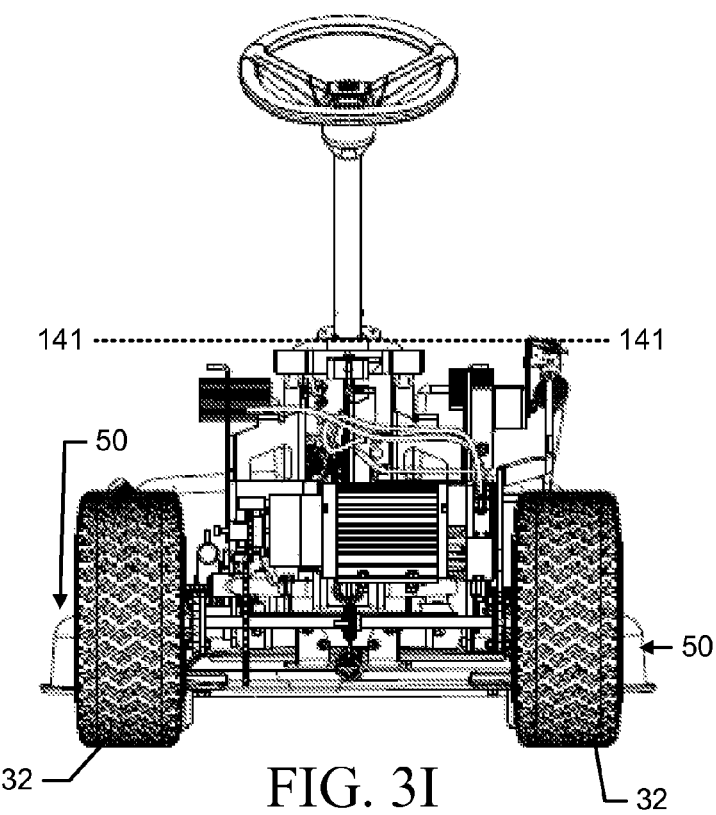
FIG. 3I illustrates a back view of the riding lawn mower of FIG. 3H according to an example embodiment.
Figure 3L:
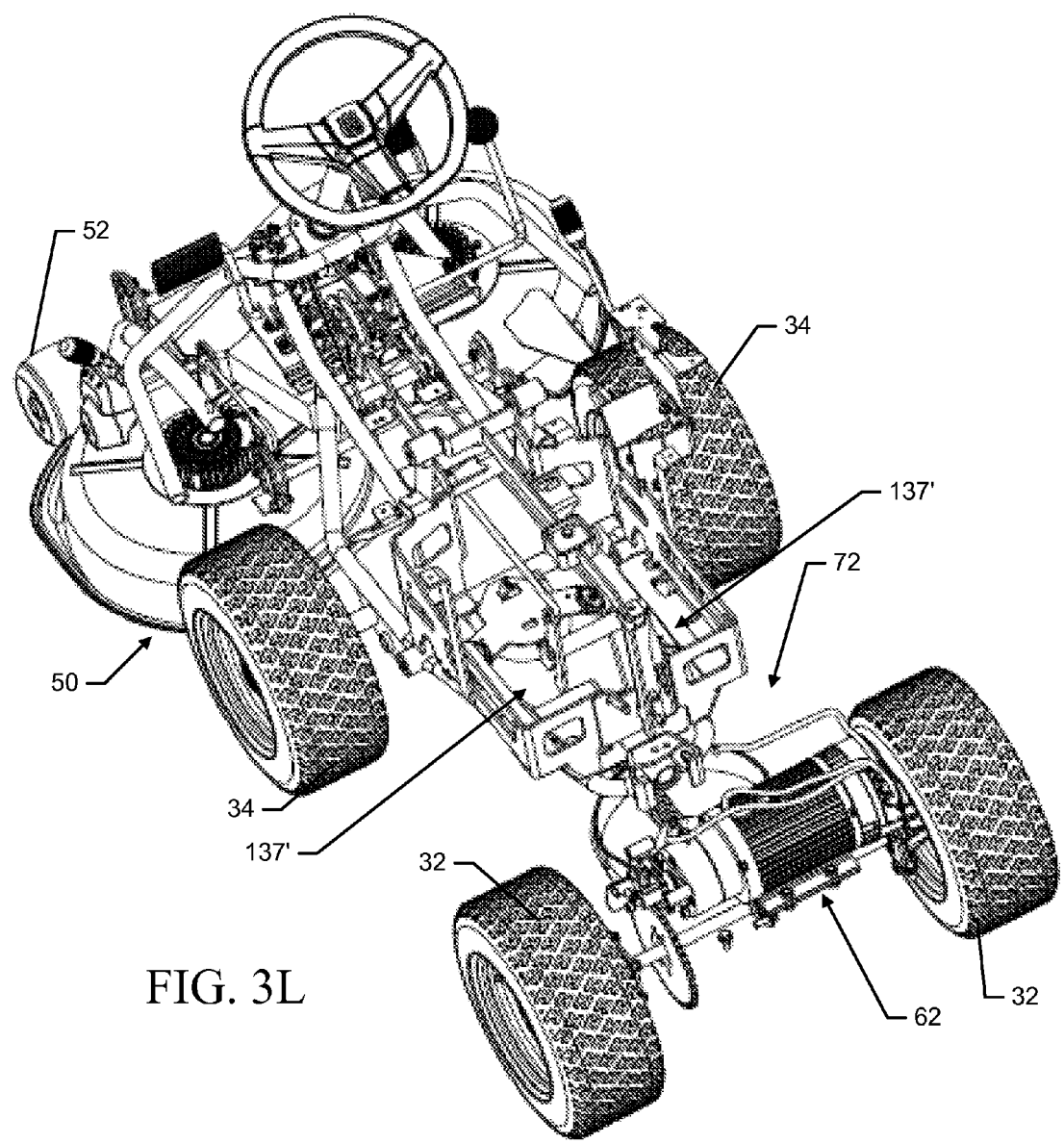
FIG. 3L illustrates a perspective top view of the riding lawn mower of FIG. 3H according to an example embodiment.

Likewise, FIGS. 3A-3L illustrate the battery powered riding lawn mower 10 according to various exemplary embodiments. For example, FIGS. 3A-3D illustrate various views of the riding lawn mower of FIG. 1A according to some embodiments. Additionally, FIGS. 3E-3I and 3L illustrate various views of the riding lawn mower of FIG. 3A with parts of the housing removed according to some embodiments. FIG. 3J illustrates a side view of the riding lawn mower of FIG. 3H and illustrates a side cross-sectional view of the drive motor compartment according to an example embodiment. FIG. 3K illustrates the side cross-sectional view of the drive motor compartment of FIG. 3J according to an example embodiment. Each of these views illustrates components previously discussed above with respect to the description of FIGS. 1A-1B.

Figure 4A:
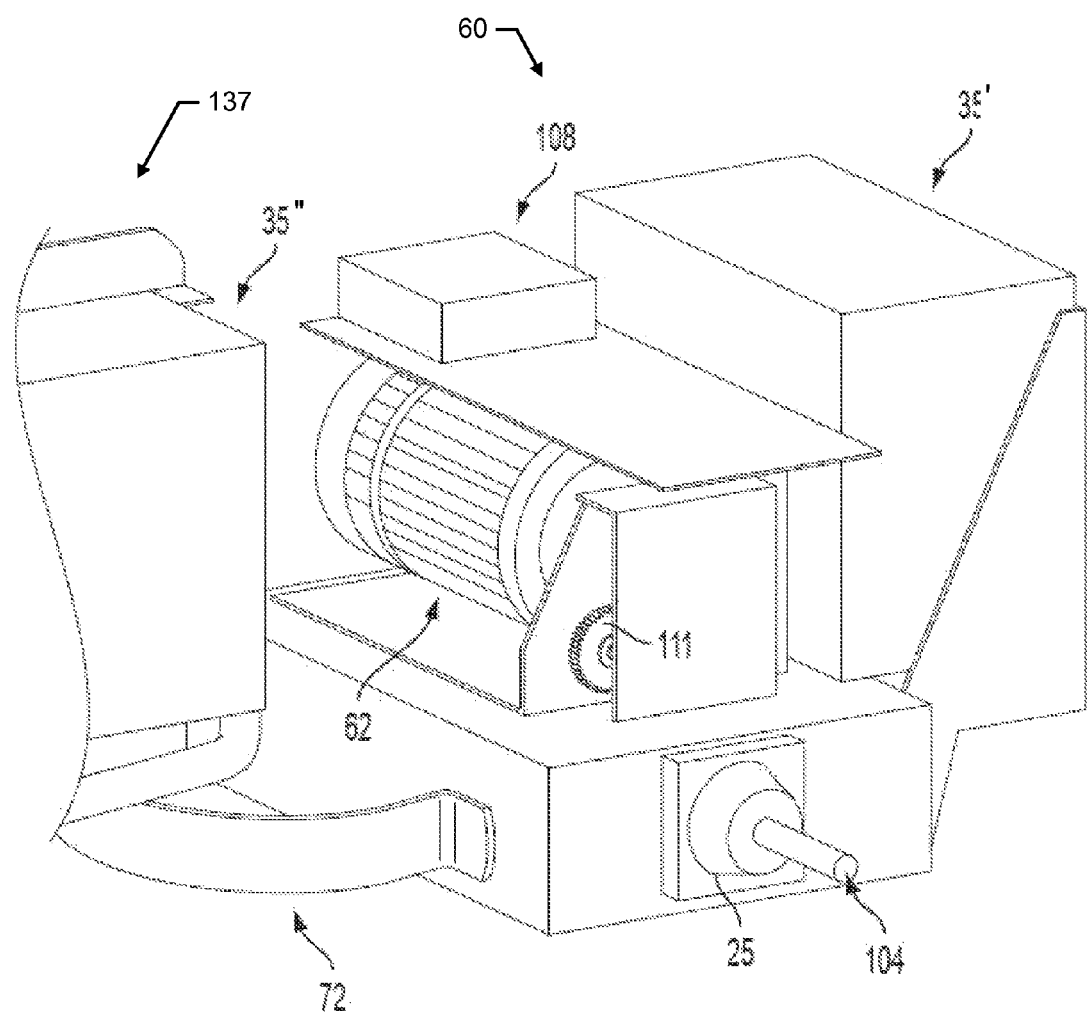
FIG. 4A illustrates a first perspective side view of a drive motor compartment area of a battery powered riding lawn mower according to an example embodiment.
Figure 4B:
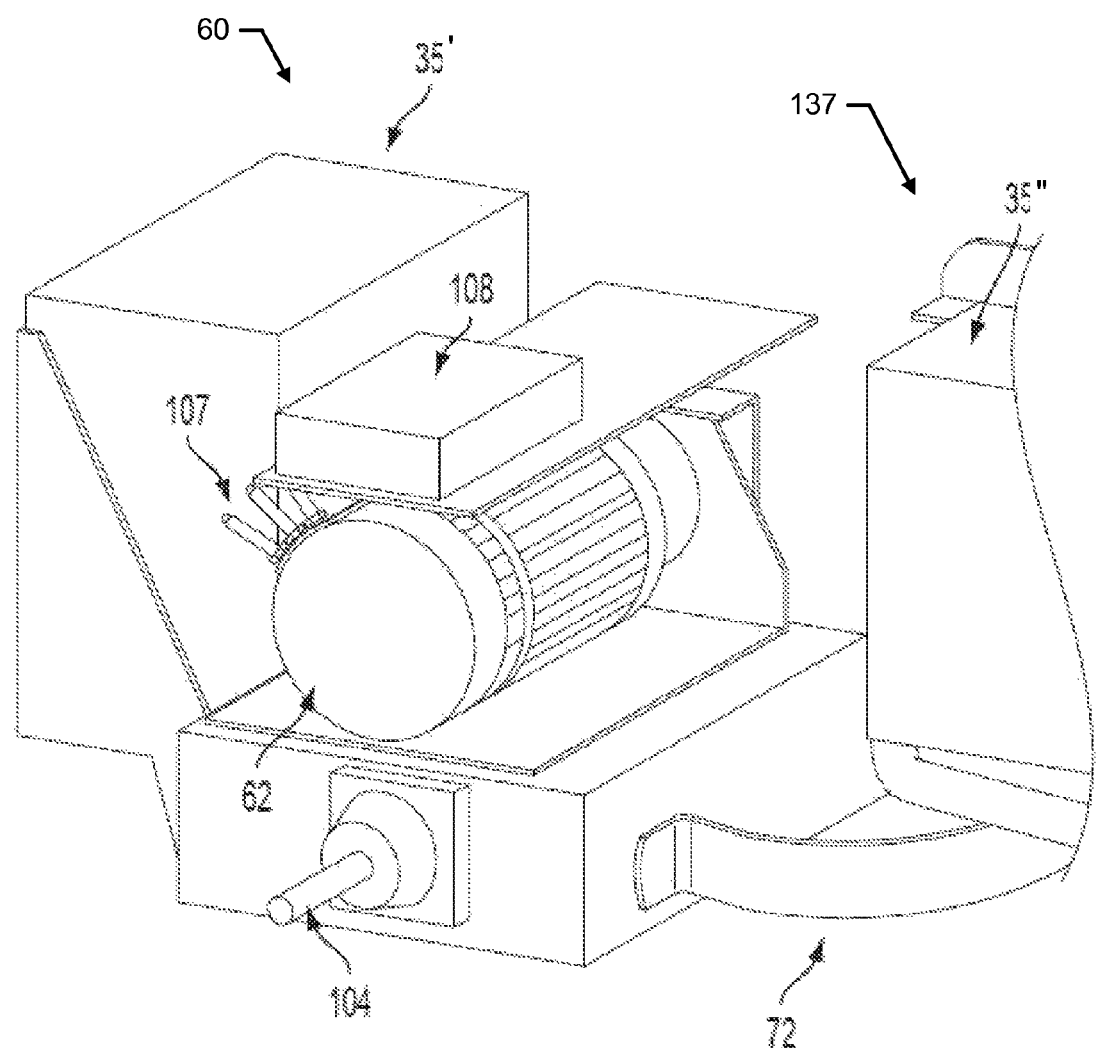
FIG. 4B illustrates a second perspective side view of the drive motor compartment area of a battery powered riding lawn mower according to an example embodiment.

FIGS. 4A-4F, 5 and 6 illustrate components for the battery powered riding lawn mower 10. The components for the battery powered riding lawn mower 10 may include an electric drive motor 62, a battery system 35, an axle 104, wheels 32, a differential 106, wiring 109 and a control system 108, according to some embodiments. Referring first to FIGS. 4A-4B, these figures illustrate the drive motor compartment 60 with the housing (shown in FIGS. 1A and 3C-3E) removed so that the interior working components of the drive motor compartment 60 are visible. Additionally, FIGS. 4A-4B and 4E-4F illustrate the articulated joint 72 which connects the drive motor compartment 60 with the rest of the battery powered riding lawn mower 10.

As illustrated in FIGS. 4A-4B and 4D-4F, the battery system 35, according to one embodiment, includes one or more batteries coupled to a load on the battery powered riding lawn mower 10. In one embodiment, the load is a drive motor. In another embodiment, the load is one or more blade motors of the cutting deck. In yet another embodiment, the load is both a drive motor and one or more blade motors of the cutting deck.

The battery system 35 serves as the primary source of power for the battery powered riding lawn mower 10. In one embodiment, the battery system 35 is the only power source for the battery powered riding lawn mower 10 such that the battery powered riding lawn mower 10 is configured to concurrently supply all of the power to drive the wheels 32 of the battery powered riding lawn mower 10 via the drive motor 62 while fully supplying the power to drive the blade motors 110 of the cutting deck 50. In addition, the battery system 35 could not only be used as the primary power for the drive motor 62 and the cutting deck motor 110, but can also supply power for any other component on the battery powered riding lawn mower 10, such as a display panel, control systems, headlights, or any other device which may be operated via electrical power on the battery powered riding lawn mower 10. This allows the battery powered riding lawn mower 10 to operate without any gasoline-based engines or motors needed for drive, cutting or any other purposes.

Figure 4C:
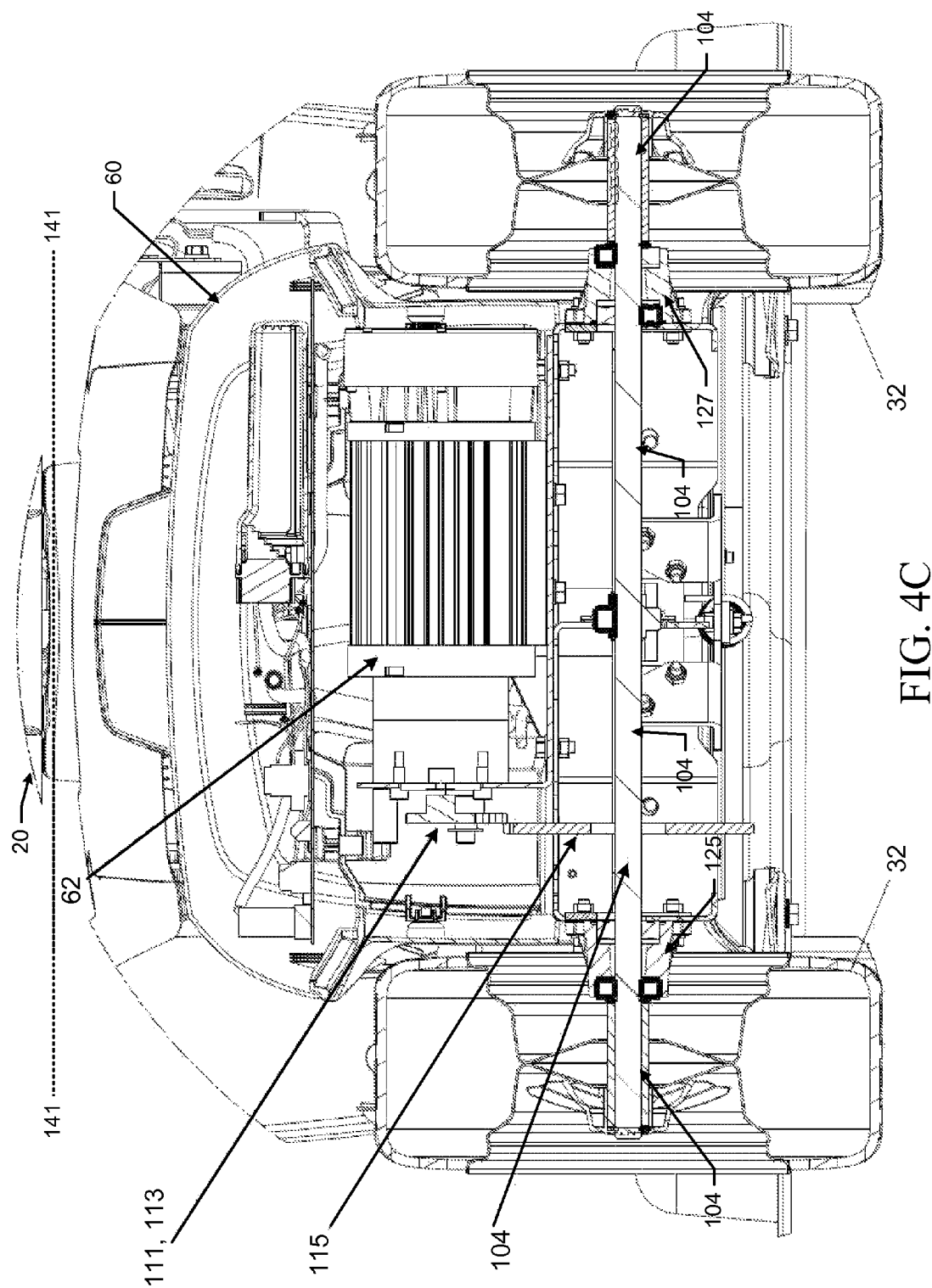
FIG. 4C illustrates an interior view of the drive motor compartment including a view of a configuration of the drive motor, axle and wheels of a battery powered riding lawn mower according to an example embodiment.
Figure 4D:
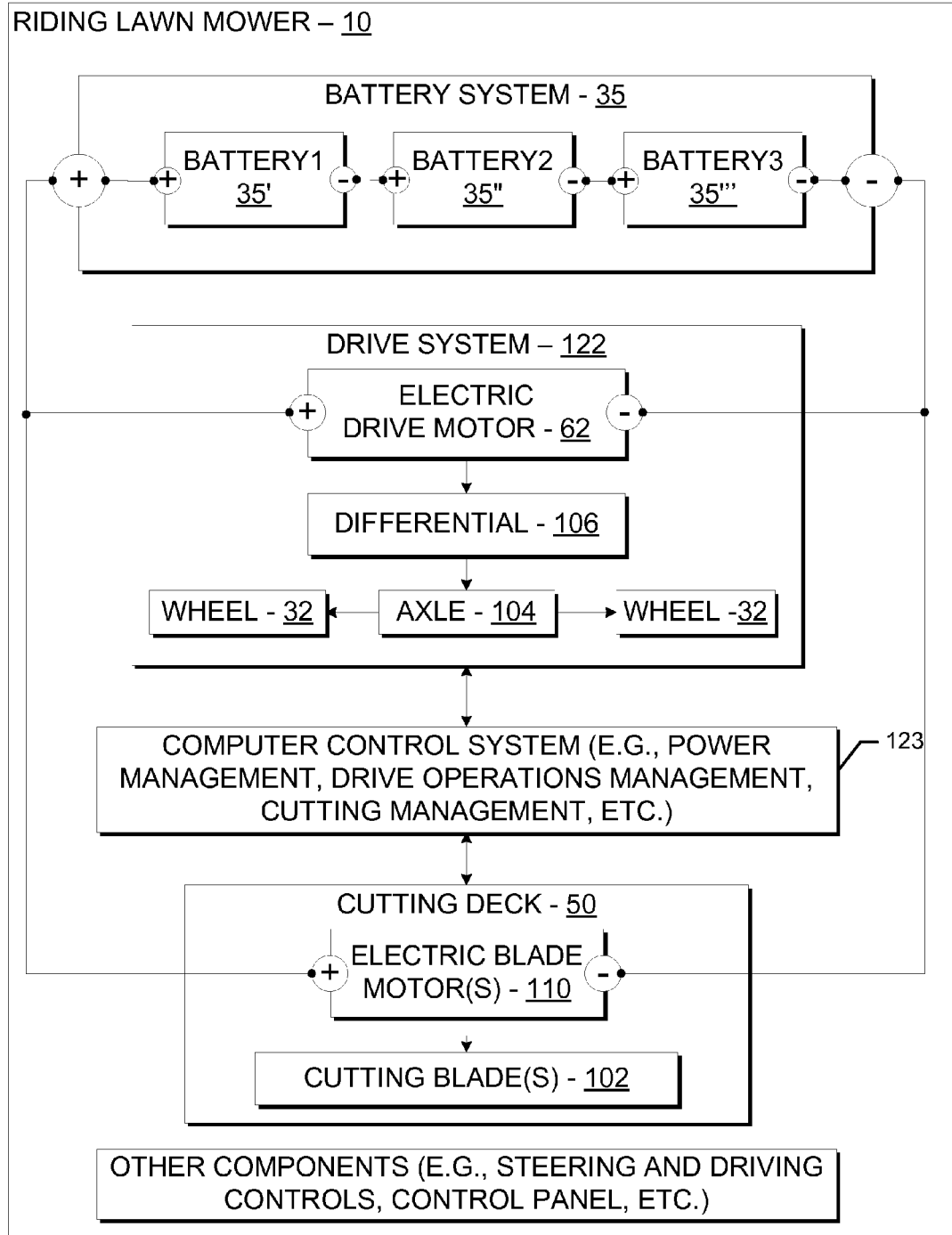
FIG. 4D illustrates a block schematic drawing of a riding lawn mower according to an example embodiment.

In exemplary embodiments and as best diagrammed in the exemplary illustration of FIG. 4D, the battery system 35 may include one or more batteries connected in series and may be collectively coupled in parallel to the drive motor 62 as well as the cutting deck motors 110 on the battery powered riding lawn mower 10. The battery system 35, according to one exemplary configuration, includes three batteries 35', 35", and 35'" (the third battery 35'" is shown in FIGS. 4E-4F). One battery 35' of the battery system 35 may reside in the drive motor compartment 60 and be primarily supported by rear axle 104 and the rear wheels 32, while two other batteries 35" and 35'" of the battery system 35 may be mounted to the forward frame portion in a second compartment proximate to the seat 20 of the battery powered riding lawn mower 10 between the front axle (e.g., the axle supporting the front wheels 34) and the articulated joint 72. In this way, much of the weight of the batteries 35" and 35'" may be supported by the front wheels 34. Therefore, in one embodiment, the weight of the battery system 35 is distributed across the axles of the battery powered riding lawn mower 10. In another embodiment, the weight of the battery system 35 is distributed about the frame of the battery powered riding lawn mower 10 so that the weight is distributed about the frame.

In another embodiment, the battery powered riding lawn mower 10 may include a plurality of separated compartments and the weight of the battery system 35 may be distributed between compartments of the battery powered riding lawn mower 10. Each compartment may include a housing and an interior area, where one or more batteries can be disposed or secured into the interior area of each compartment. For example, as shown in FIGS. 3A-3I, the battery powered riding lawn mower 10 has a drive motor compartment 60 and a front compartment 137, both of which having a housing and an interior area within each housing. To illustrate this using FIGS. 3A-3I, the front compartment 137 is illustrated as having a housing 137" and an interior area 137' where one or more batteries may be secured or disposed in the front compartment 137. It is noted that both the front and drive motor compartments 60 and 137 are disposed below a horizontal plane 141 defined by the base of the operator's seat 20 and proximate (at or just above) a horizontal plane defined by the front and rear axles. One of the more significant problems with an electric vehicle is the positioning of the heavy and often bulky batteries, motors, and other components in such a way so as to maintain the vehicle's balance, stability, traction, etc. The figures provided herein illustrate a solution to this problem by illustrating how a plurality of heavy batteries and electric motors can be integrated into an articulated riding lawn mower in such a way that the riding lawn mower maintains a relatively low center of gravity and good balance, traction, stability, rollover resistance, acceleration, deceleration and turning performance.

As discussed above, the battery powered riding lawn mower 10 may include a drive motor compartment 60 located at a distal end of the battery powered riding lawn mower 10. The drive motor compartment may be attached directly to a steering axle of a zero-turn riding lawn mower. The battery powered riding lawn mower 10 may further include one or more front compartments, such as front compartment 137. The front compartment(s) 137 may be separated from the drive motor compartment 60, such as via an articulated joint 72, any other type joint, a separator, a compartment housing wall(s), or any other way to separate two compartments from each other.

In one embodiment, a drive motor compartment can house one or more batteries of the battery system 35, while the other compartment(s) may also house one or more batteries of the battery system 35. For example, as illustrated in FIGS. 4E-4F, one battery 35' of the battery system 35 may be housed and supported by the drive motor compartment 60, while two batteries 35", 35'" may be housed and supported by the front compartment 137. In another embodiment, the drive motor compartment 60 may house the driving motor 62 and one battery 35' of the battery system 35, where the driving motor 62 and/or the drive motor compartment 60 is connected directly to a single steering axle of a zero-turn lawn mower. As described above, in some embodiments the riding lawn mower is steered by pivoting the steering axle 104 about the articulated joint 72 relative to the front axle. In some such embodiments such as in the embodiment illustrated by the figures herein, the drive motor compartment 60 pivots along with the steering axle 104 about the articulated joint relative to the front compartment 137 and the front axle. In another such embodiment, the drive motor compartment 60 may be fixed relative to the front compartment 137 and the steering axle 104 may pivot beneath the drive motor compartment 60. In still other embodiments, the It should be noted that there may be more than two compartments that may be physically separated from each other, whereby each compartment may house or support one or more batteries of the battery system. It should be further noted that the weight distribution between compartments may be equal or unequal. For example, in the above mentioned example, the drive motor compartment 60 has only one battery 35' and one axle 104 to support a majority of the weight of such battery, while two other batteries 35", 35'" of the battery system be disposed in a front, separate compartment over another axle, thereby creating more weight over the other axle of the front compartment than the axle supporting the drive motor compartment 60.

In yet another embodiment, all of the batteries of the battery system may be located lower than a plane (as depicted by the line 141-141 in FIGS. 3B-3C, 3I-3J and 4C) defined by the base of the operator's seat. Such plane may be substantially parallel to the ground. Alternatively, instead of the plane being defined by the base of the operator's seat, the plane (as depicted by line 141-141) may instead be defined by the top of one of the compartments, such as the top of the front compartment 137.

In yet another embodiment, the batteries of the battery system 35 may be located at or higher than a plane defined by two or more of the axles. According to an embodiment, the batteries of the battery system are located above the axles and also below the plane defined by the base of the operator's seat.

In yet another embodiment, any battery of the battery system 35 that is located in the drive motor compartment may be mounted over the axle 104 supporting the compartment 60 or may be mounted so that no portion of the battery is located above an axle 104 of the drive motor compartment 60 (as illustrated in FIGS. 4A-B).

The battery system 35 may be removably mounted to the frame 70 of the battery powered riding lawn mower 10 so that the batteries of the battery system 35 may be secured to the frame while the battery powered riding lawn mower 10 is in operation but also allowing the batteries of battery system 35 to be replaced when the battery powered riding lawn mower 10 is not in operation.

The batteries of the battery system may be mounted so that if one compartment houses two batteries, the batteries may be side-by-side or adjacent as is illustrated by the batteries 35", 35'" located in the front compartment 137 of FIGS. 4E-4F. As such, the batteries of the battery system may be in a triangular formation if there are three batteries (as shown in FIG. 4E), a rectangular formation if there are four batteries (not illustrated), or any other formation. This allows a distribution of weight of the battery system substantially equally along the frame so that the drive motor compartment (or other area of the riding lawn mower) does not bear a substantial amount of weight of the complete battery system 35. Accordingly, such distribution of weight also allows the drive motor compartment to maneuver more freely relative to the other parts of the riding lawn mower 10, which may especially be helpful when the drive motor compartment is used for steering in an articulating riding lawn mower as illustrated in the figures. It should be understood that while embodiments of the present disclosure are applicable to a articulating riding lawn mower, these embodiments may also be applicable to any other type of lawn mower, including a front-steering lawn tractor, zero-turn lawn mower, and the like.

The battery system 35 can be made up of various types of batteries, such as lithium batteries, lead-acid batteries, nickel-cadmium, nickel-metal hydrides (NiMH), zinc-air or any other battery type. The battery system may be a direct current ("DC") battery system according to one embodiment, but should not be limited to DC. The battery system 35 can include a battery management system configured to control charging and recharging of the batteries. This is possible by having a receptacle 51 (shown in FIGS. 3A, 3C and 3D) that is accessible to a user so as to allow a user to connect the battery management system to a 110V (or other voltage) power outlet. The receptacle could be a three prong 110V outlet configured to receive 110 V power via a three prong 110 V plug. The 110 V power may be power that is accessible from standard outlets in consumers' homes. The receptacle could be covered with a cover over the receptacle to shield the receptacle from debris, liquids and the like and also for aesthetic reasons. In one embodiment of the invention, the receptacle is mounted to the rear frame portion in the housing that covers the battery mounted to the rear frame portion so that the receptacle is located rearward of the battery. In the illustrated embodiment, the housing includes a hinged cover for covering the receptacle when not being used to charge the batteries. In one embodiment, the battery powered riding lawn mower 10 may be recharged, at least in part, via solar cells.

As mentioned briefly above, the battery system 35 may be coupled to the drive motor 62 so as to be the primary power for the drive motor 62. Contacts 107 may provide electrical connection between the battery system 35 and the drive motor 62. The contacts 107 may consist of three wires which allows positive, negative and neutral connections to electrically couple the battery system 35 with the drive motor 62, thereby providing a means to transport voltage and current (power) to the drive motor 62.

The drive motor 62 may be an electric motor that is operable to drive the wheels 32 of the battery powered riding lawn mower 10 by transmitting a rotational driving force to at least the wheels via a differential 106 when electric power is supplied to the drive motor 62. It should be noted that the electric motor may also function as an electric generator that can recover regenerative energy when a braking force is applied to the wheels 32, according to one embodiment. The drive motor 62 may generate a rotational force to one or a series of gears. As illustrated in FIGS. 4A-4C, the drive motor 62 applies rotational forces to two gears 111, 113 each of which rotate about respective axles. As discussed below with respect to FIG. 5, these gears 111, 113 translate the generated rotational force to a differential 106 so as to operate the differential 106. The differential 106, as discussed below, rotates both wheels 32 on the axle 104 so that a single motor 62 may operate both wheels 32 of the axle 104.

FIG. 4C illustrates the drive motor compartment with the housing removed to show the drive motor 62 connected with the axle 104 via gears 113 and 115. No chain is illustrated as connecting gears 113 and 115 but it should be understood that a chain can be disposed around the gears to mechanically translate rotational forces from gear 113 to gear 115 which in turn rotates the axle 104 and thus, the wheels 32.

FIG. 4D illustrates a block diagram illustrating schematically a riding lawn mower configuration including a battery system 35, a drive system 122, a cutting deck 50, a computer control system 123 and other components 124 according to example embodiments. The drive system may include an electric motor 62, a differential 106, an axle 104 and wheels 32. The cutting deck 50 may include at least one electric blade motor which is rotatably connected with cutting blades, each cutting blade may have an exclusively separate blade motor. As previously mentioned, a series of batteries 35', 35" and 35'" may be connected in series to form a battery system 35. The collective output of the battery system 35 may be connected in parallel to an electric drive motor 62 and a cutting deck 50. A computer control system 123 may be connected to both the cutting deck 50 and the drive system 122 for various purposes. The computer control system 123 may be configured to manage power output and/or consumption of the battery system 35 by the drive motor 62 and/or the electric blade motor(s) 110 so that a single computer system 123 and a single battery system 35 may be allowed to concurrently, fully and automatically operate both the cutting deck 50 and the drive system 122. Although not illustrated in FIG. 4D, the computer control system may be connected in series or in parallel with the battery system to control power output of the battery system 35. The computer control system 123 includes a processor and memory and can receive feedback from the cutting deck 50 and the drive system 122 as well as control power to the electric drive motor 62 and the electric blade motor(s) 110. The computer control system 123 can also communicate with any other control operations of the riding lawn mower 10 and any other computer components via any network internal or external to the riding lawn mower. As previously discussed, the riding lawn mower 10 may also include other components 124, such as steering and driving controls, any control panel, housing components, seating, displays, software, and the like.

Referring now to FIGS. 4E-4F, FIGS. 4E-4F illustrate top and side views of the riding lawn mower of FIGS. 1B and 1A, respectively, with the housing, wheels, axle and other components removed so that the battery locations can be illustrated according to an example embodiment. As illustrated in FIGS. 4E-4F, the battery system 35 may include a plurality of batteries, such as three batteries 35', 35", 35'". In cases in which multiple batteries 35', 35", 35'" are combined to form the battery power source 74, the batteries 35', 35", 35'" may be distributed or located near one another. FIGS. 4E-4F illustrate an example embodiment where three twelve volt batteries 35', 35", 35'" make up the battery system 35. These batteries 35', 35", 35'" are connected in series and their locations may be distributed throughout the battery powered riding lawn mower 10. As shown in the illustrative embodiment of FIGS. 4E-4F, one or more batteries 35' may be disposed in the drive motor compartment 60, while other batteries 35", 35'" may be disposed under the a central portion 131 of the riding lawn mower 10 where the operator's seat (not shown in FIGS. 4E-4F) is disposed directly thereabove or the batteries may be disposed in other locations of the battery powered riding lawn mower 10. The distribution of the batteries 35', 35", 35'" of the battery system 35 allows for weight distribution of the battery system 35 throughout the frame and axles of the riding lawn mower so that each axle shares the collectively weight of the battery system 35. In one embodiment, one of the batteries 35' of the battery system 35 is located in the drive motor compartment 60 of the riding lawn mower 10 and the receptacle 51 is not disposed directly above the battery 35'. Instead, as best illustrated in FIG. 4F, the receptacle 51 is located horizontally adjacent to a top portion 135 of the battery 35' such that the receptacle will not substantially receive any vertically-rising fumes produced by or caused by operation of or recharging of the battery 35' which may escape from the top portion 135 or other area (e.g., a side portion opposite of the receptacle) of the battery 35'. This avoids a situation where these fumes may potentially be ignited by the receptacle or by operation of the receptacle. In one embodiment, two batteries may be disposed on the drive motor compartment 60 and one or two batteries disposed in a central portion 131 of the riding lawn mower 10. One or batteries may be disposed in the front portion of the lawn mower proximate to the cutting deck or any other area of the riding lawn mower which may be configured to support the weight thereof, according to some embodiments.

Figure 5:
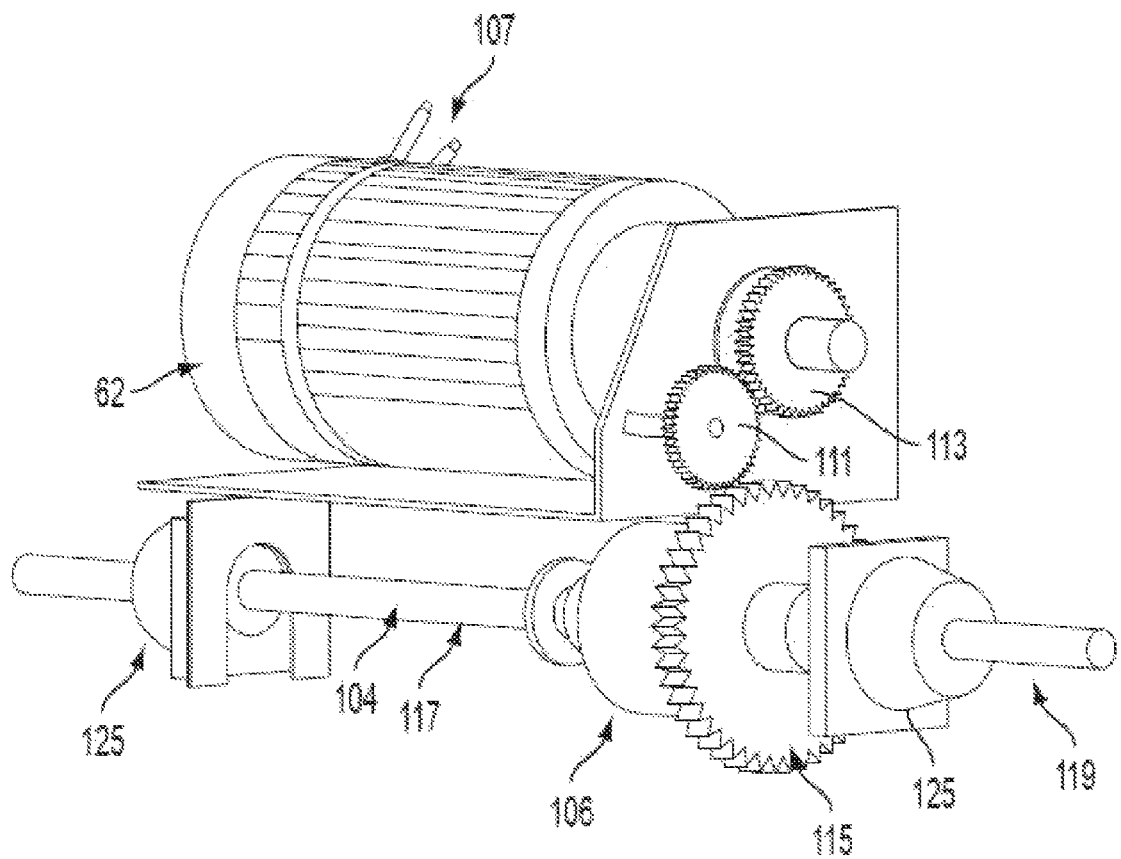
FIG. 5 illustrates a perspective view of a drive motor, differential and axle configuration of a battery powered riding lawn mower according to an example embodiment.

FIG. 5 illustrates the drive motor 62, differential 106 and axle configuration of the battery powered riding lawn mower 10 according to various embodiments. As discussed above, the drive motor 62 is powered by the battery system 35 and the driver motor 62 may have gears 111, 113 that apply a rotational force to the differential 106. The drive motor 62 may be coupled to the differential 106 via any means. In one embodiment illustrated via FIG. 5, the differential has a gear 115. This gear 115 of the differential 106 may couple to the gears 111, 113 of the driver motor 62 via a chain (not shown), as mentioned above. However, it should be noted that the drive motor 62 could be coupled to the differential 106 via any other means, such as a belt, by directly engaging gears, or any other means which may transfer rotational force to the differential 106.

The differential 106 may be any device which may simultaneously provide differing rotational speeds to opposing wheels 32 via the axle 104. As illustrated in FIG. 5, the differential 106 is coupled to the axle 104 so that a first portion 117 of the axle 104 (which connects to one of the wheels 32) is connected with one side 121 of the differential and another portion 119 of the axle 104 (which corresponds to the other wheel 32) is connected to the other side 123 of the differential 106. This allows the differential to output a first rotational speed to the first portion 117 of the axle 104 and a second different rotational speed to the second portion 121 of the axle 104 so that the first and second portion is capable of rotating at a differing speeds. And because the first axle portion 117 is connected to one wheel and the second axle portion is connected to another wheel, these two wheels are allows to rotate at varying speeds at the same time. This is especially advantageous for maneuvering of the battery powered riding lawn mower 10, such as a zero-turn radius maneuver.

Figure 6:
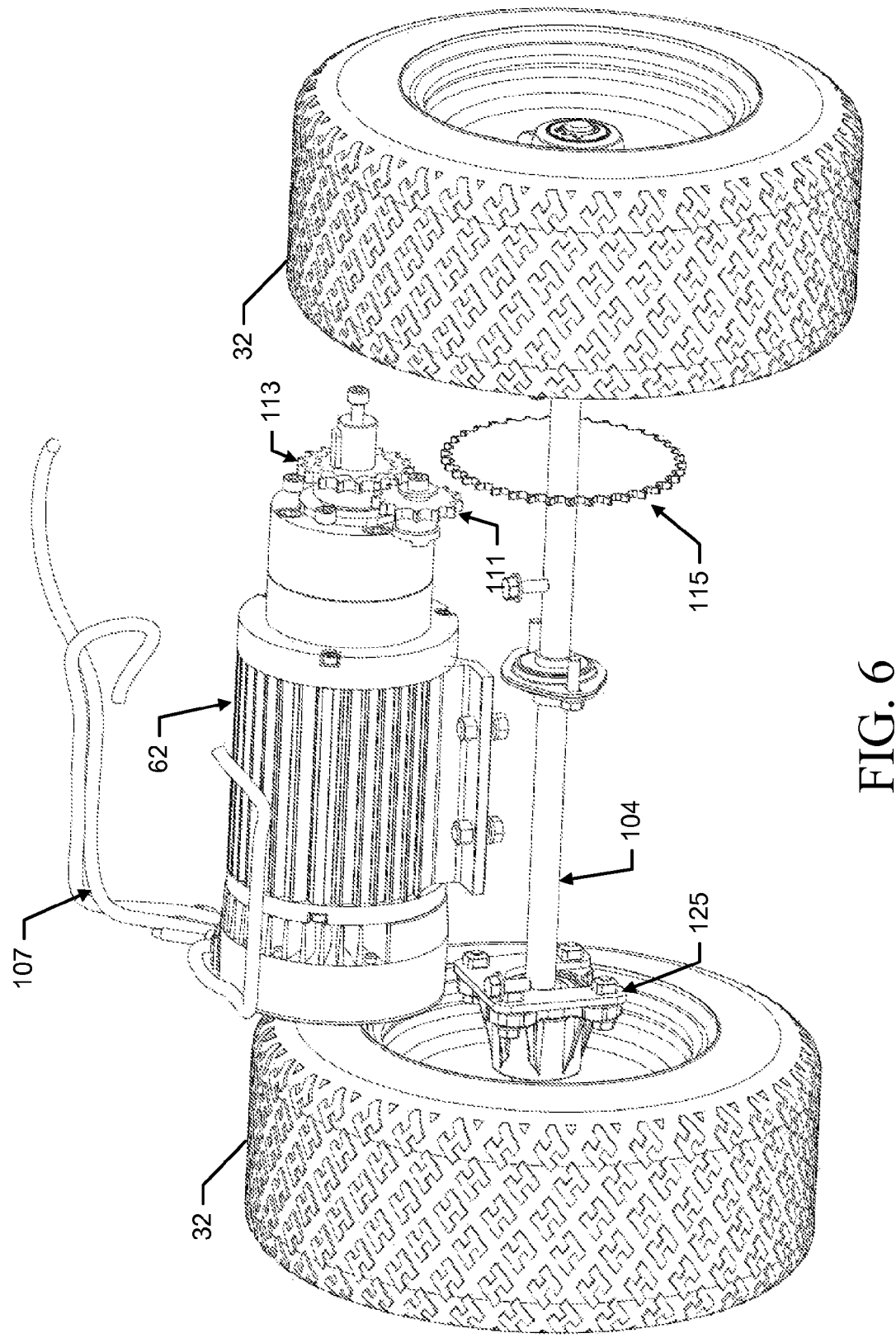
FIG. 6 illustrates a perspective view of a drive motor, axle and wheel configuration of a battery powered riding lawn mower according to an example embodiment.
Figure 7A:
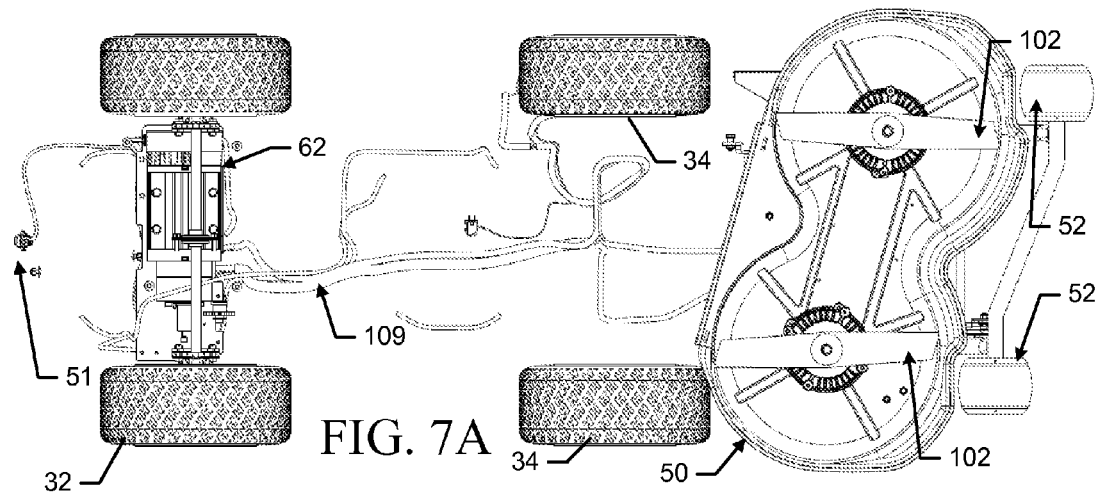
FIG. 7A illustrates a bottom view of a riding lawn mower with various components removed so that at least a portion of the wiring is exposed according to an example embodiment.
Figure 7B:
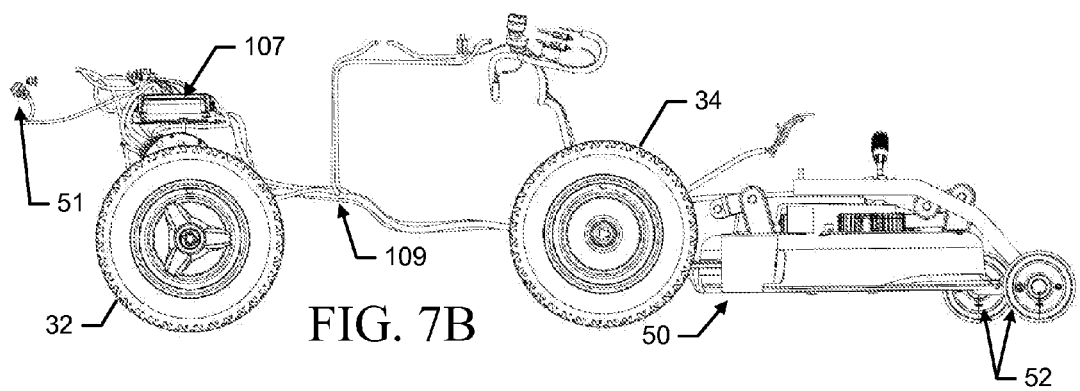
FIG. 7B illustrates a side view of the riding lawn mower of FIG. 7A according to an example embodiment.
Figure 7C:
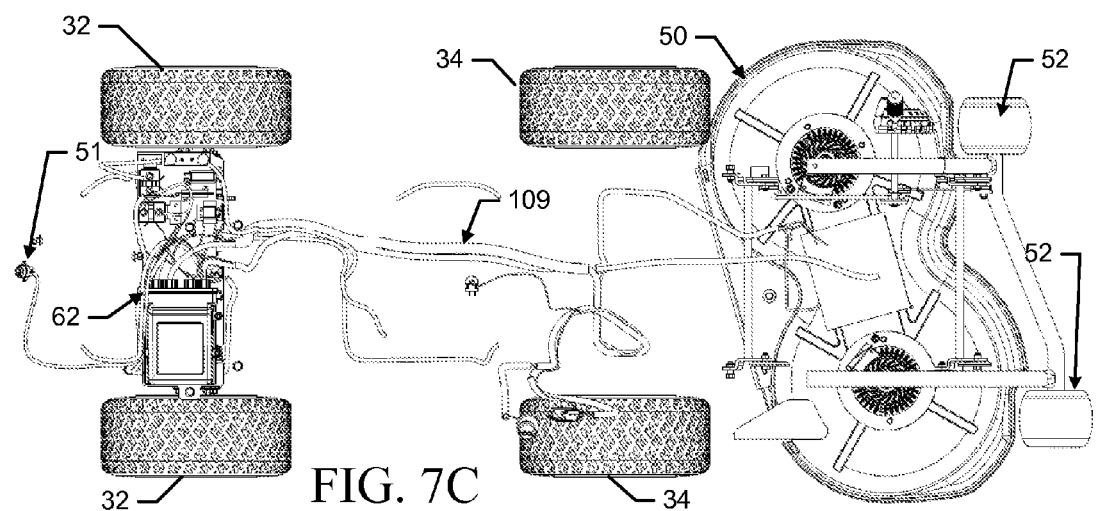
FIG. 7C illustrates a top view of the riding lawn mower of FIG. 7A according to an example embodiment.
Figure 7D:
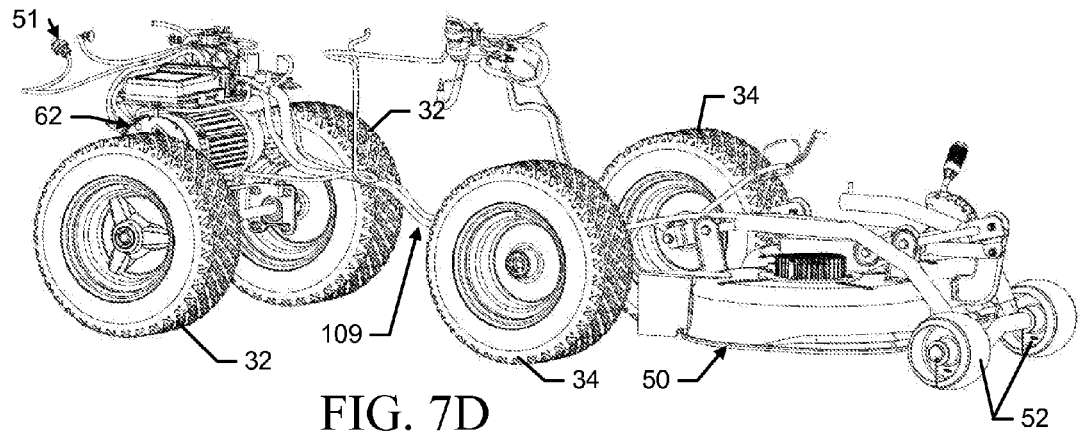
FIG. 7D illustrates a perspective view of the riding lawn mower of FIG. 7A according to an example embodiment.
Figure 7E:
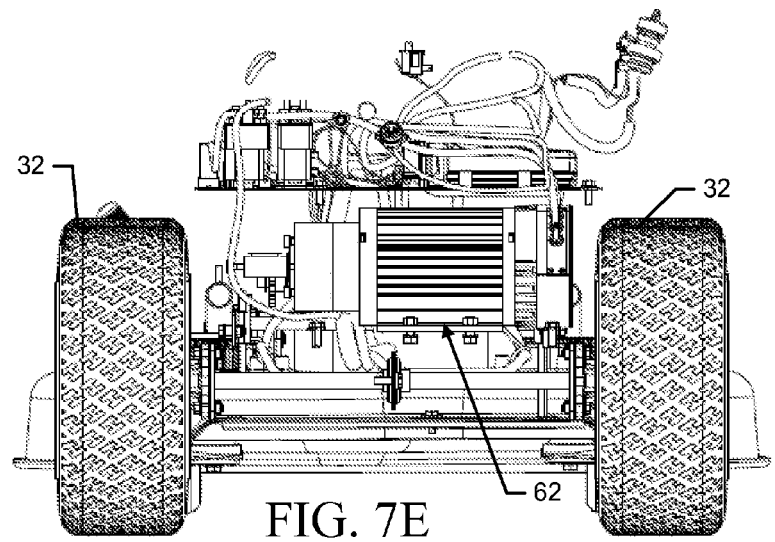
FIG. 7E illustrates a back view of the riding lawn mower of FIG. 7A according to an example embodiment.
Figure 7F:
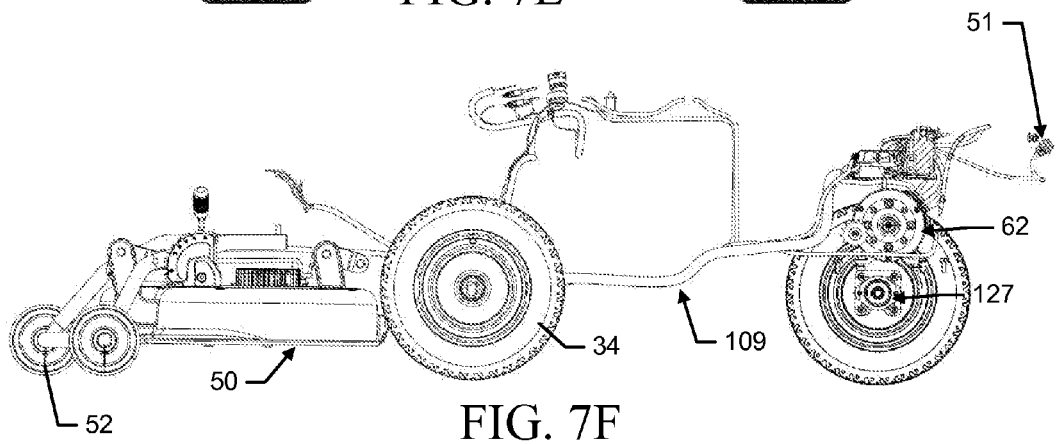
FIG. 7F illustrates a side view of the riding lawn mower of FIG. 7A according to an example embodiment.
Figure 7G:
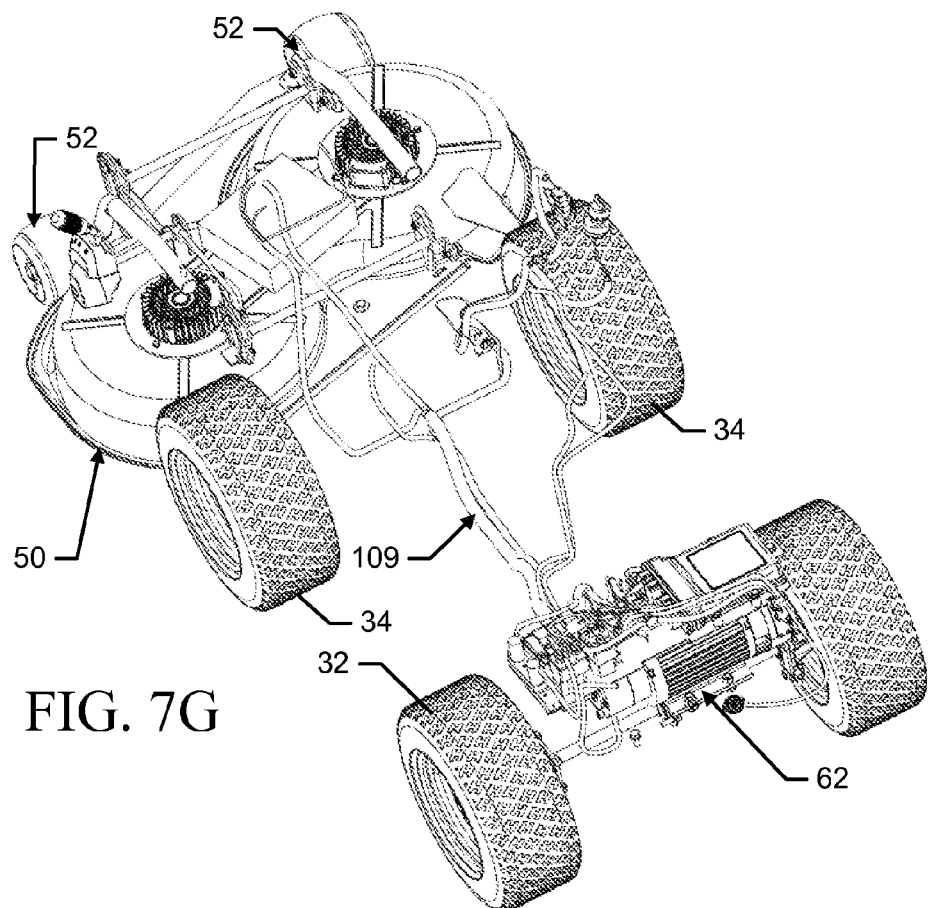
FIG. 7G illustrates a top perspective view of the riding lawn mower of FIG. 7A according to an example embodiment.
Figure 7H:
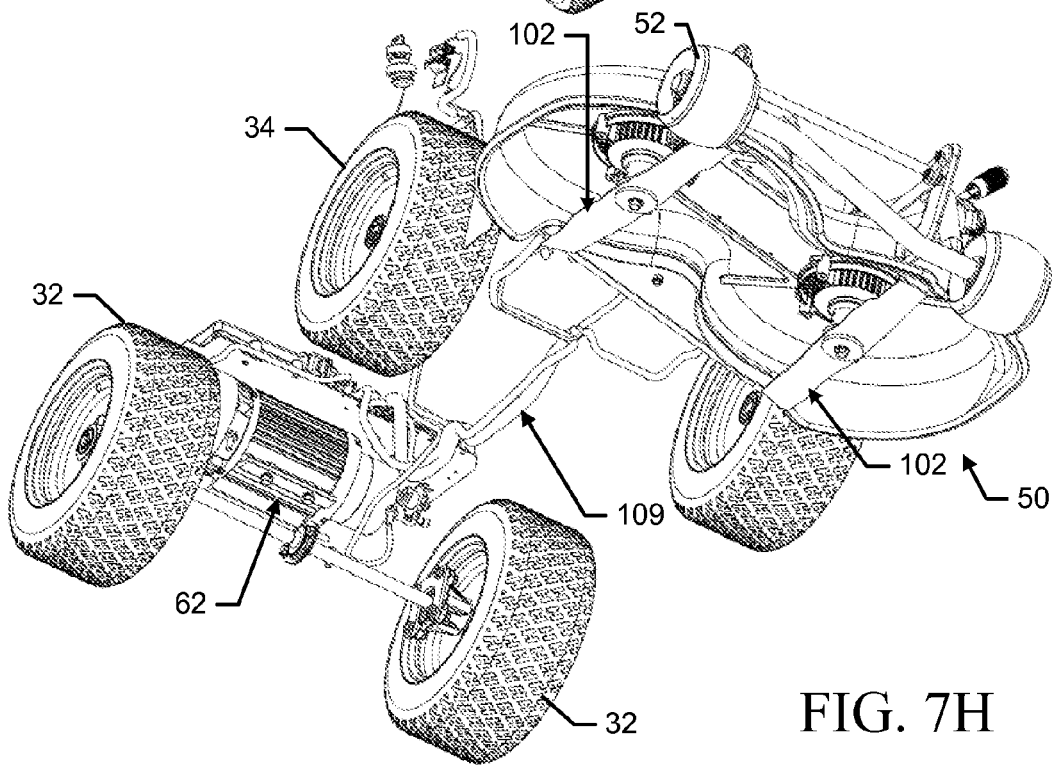
FIG. 7H illustrates a bottom perspective view of the riding lawn mower of FIG. 7A according to an example embodiment.

As illustrated in FIG. 6, the wheels 32 are attached to the axle 104 without a differential being attached to the axle 104 according to the illustrated embodiment. The wheels 32 can be any sized wheels to bear the load of the battery powered riding lawn mower 10. The wheels 32 are attached to the axle via hubs 125, 127. The hubs 125, 127 (both hubs are shown in FIGS. 4C and 5) are removeably attached to the wheels 32 so that the wheels 32 are secured to the axle 104, but may also be removed from the hubs 125, 127 in the event that the wheels 32 need to be changed, adjusted or removed from the battery powered riding lawn mower 10 for any other reason.

FIGS. 7A-7H illustrate the battery powered riding lawn mower 10 of FIG. 1 with various components removed so that the wiring 109 of the battery powered riding lawn mower 10 can be viewed according to some embodiments. As illustrated the drive motor 62 may be connected to the drive motor compartment 60 of the battery powered riding lawn mower 10 and wiring is provided from the battery system 35 (not shown in FIGS. 7A-7H) to the drive motor 62. Since the battery system 35 may be proximate to the drive motor 62, the wiring therebetween need not be a great distance. It should also be noted that there may be wiring in between the batteries of the battery system 35 to connect the batteries in serial and to connect the battery system 35 collectively in parallel with the desired load, such as the drive motor 62, the cutting deck 50, and/or any other electrical component of the battery powered riding lawn mower 10. As illustrated, the wiring 109 may also be connected to control panels, sensors, steering components, and the cutting deck 50. The cutting deck 50 has wiring from battery to a control panel 120, which distributes power to the blade motors 110. Thus, the cutting deck 50 is capable of being operated by the same battery system 35 that supplies power to the drive motor 62.

The wiring for the cutting deck 50 may originate from the battery system 35 which may be located at the drive motor compartment (or underneath the seat area) along the frame or housing of the battery powered riding lawn mower 10 to the control panel 120 of the cutting deck 50. The wiring can be secured to the frame or housing of the battery powered riding lawn mower 10, can be secured to conduit or can be secured to the battery powered riding lawn mower 10. It should be noted that the wiring need not be secured and could be freely resting within the frame or housing of the battery powered riding lawn mower 10.

The wiring should be of such gauge to support the current and power that the wires will be carrying. The power of the battery system 35 may be any amount, such as between 1600-2700 Watts with a voltage of approximately 36 Volts according to some embodiments. This may be useful for the exemplary embodiment described above that connects three batteries in series and each battery outputting approximately 12 V and the voltage and power of the battery system being cumulative for all three batteries.

The control panel 120 of the battery powered riding lawn mower 10 includes components coupled with the blade motors 110 to distribute electrical power to each respective blade motor 110. It should be noted that the Figures illustrate the battery powered riding lawn mower 10 including two blade motors 110, but any amount of blade motors may be controlled, such as a single blade motor or more than two blade motors. As previously discussed with respect to FIG. 2, the blade motors 110 each operate to rotate each respective blade to cut material, such as grass, that enters the cutting area of the cutting deck 50. The control panel 120 of the battery powered riding lawn mower 10 may provide power to each blade motor 110 independently so that the blades may rotate at speed independent from each other or timed according to a specification controlled by the lawn mower controller. The control panel 120 may include power converters and/or amplifiers to adjust the incoming power to the power required to rotate the respective blades at a certain speed. The control panel 120 may include a processor and memory and control the cutting blades via a computer. Regardless, the control panel 120 is free to use the electrical power received from the battery system 35 in any manner desired.

According to one embodiment, the battery system 35 that powers the blade motors 110 may be the same battery system 35 that powers the drive motor 62 so that the battery system 35 concurrently and fully provides power to both drive the battery powered riding lawn mower 10 and to the cutting deck. This may be done without a gas engine or other gasoline-based component. This is advantageous because gasoline would no longer been needed to operate the lawn mower and many of the disadvantages of a gas-powered mower as previously discussed, such as being noisy, environmentally polluting, expensive to operate and requiring high amount of maintenance, are reduced or eliminated.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn mower comprising:
a front frame portion;
a rear frame portion;
an articulated joint operably coupling the front frame portion to the rear frame portion, wherein the rear frame portion is pivotable relative to the front frame portion about a vertical axis defined by the articulated joint;
a front wheel axle disposed on the front frame portion;
a rear wheel axle disposed on the rear frame portion;
an electric drive motor disposed on the rear frame portion and operably coupled to a first rear wheel and second rear wheel disposed on the rear wheel axle in order to drive the first rear wheel and second rear wheel; and
a battery system comprising a first battery and a second battery, the first and second batteries being electrically connected in series and collectively electrically coupled to a load comprising at least the electric drive motor,
wherein the first battery is disposed on the front frame portion between the front wheel axle and the articulated joint;
wherein the second battery is disposed on the rear frame portion completely rearward of the rear wheel axle and the electric drive motor; and
wherein a longitudinal axis of the second battery is perpendicular to a longitudinal axis of the riding lawn mower,
wherein the electric drive motor is disposed within a drive motor compartment, the drive motor compartment being disposed on the rear frame portion higher than a first horizontal plane defined by the rear wheel axle.

2. The riding lawn mower of claim 1, further comprising:
a front wheel operably coupled to the front frame portion; and
wherein the riding lawn mower is configured to steer by pivoting the rear frame portion relative to the front frame portion about the articulated joint such that the first rear wheel and the second rear wheel change orientation relative to the front wheel.

3. The riding lawn mower of claim 1, further comprising:
a seat for an operator, wherein the first battery and the second battery are disposed lower than a second horizontal plane defined by the bottom of the seat.

4. The riding lawn mower of claim 1, wherein the first battery and the second battery are disposed proximate to or higher than the first horizontal plane.

5. The riding lawn mower of claim 1, further comprising:
a front-mount cutting deck disposed forward of the front wheel axle, and
wherein the load further comprises:
a cutting motor configured to drive a cutting blade, wherein the cutting motor and the electric drive motor are electrically coupled in parallel to the battery system.

6. The riding lawn mower of claim 1, wherein the riding lawn mower is an electric riding lawn mower and does not comprise a gas engine.

7. The riding lawn mower of claim 1, wherein the battery system further compromises:
a third battery electrically connected in series to the first battery and the second battery,
wherein the third battery is operably coupled to the front frame portion, and
wherein the first battery, second battery, and third battery are each rechargeable twelve-volt lead-acid batteries.

8. The riding lawn mower of claim 1, wherein a position of the first battery between the front wheel axle and the articulated joint and the second battery completely rearward of the rear wheel axle and the electric drive motor, balances the weight of the battery system across the front axle and the rear axle.

9. The riding lawn mower of claim 1, wherein a position of the first battery between the front wheel axle and the articulated joint and the second battery completely rearward of the rear wheel axle and the electric drive motor, balances the weight of the battery system across the front axle, the rear axle, and a frame comprising the front frame portion, the rear frame portion and the articulated joint.

10. The riding lawn mower of claim 1,
wherein the first rear wheel and the second rear wheel are operably coupled to each end of the rear wheel axle; and
a mechanical differential operably coupling the rear wheel axle to the electric drive motor so that when the drive motor is powered by the battery system, rotational forces are distributed to the rear wheel axle, thereby rotating the first rear wheel and the second rear wheel.

11. The riding lawn mower of claim 10, wherein, in response to the electric drive motor being electrically powered, the mechanical differential outputs different rotational forces to each of the first rear wheel and the second rear wheel so the first rear wheel is forced to rotate at a different speed than the second rear wheel.

12. The riding lawn mower of claim 10,
wherein the rear wheel axle comprises a first section and a second section and the mechanical differential comprises a first portion and a second portion,
wherein the first portion of the mechanical differential is operably coupled to the first section of the rear wheel axle,
wherein the second portion of the mechanical differential is operably coupled to the second section of the rear wheel axle, wherein the mechanical differential receives rotational forces from the electric drive motor and translates the rotational forces to differing rotational forces to the first section of the rear wheel axle and the second section of the rear wheel axle so that the first and second sections of the rear wheel axle rotate at different speeds.

13. The riding lawn mower of claim 10, further comprising a chain connecting the electric drive motor and the mechanical differential, wherein the chain is connected to a gear of the electric drive motor and a gear connected to the mechanical differential.

14. A riding lawn mower comprising:
a front frame portion;
a front compartment disposed on the front frame portion;
a rear frame portion;
a drive motor compartment disposed on the rear frame portion;
an articulated joint operably coupling the front frame portion to the rear frame portion, wherein the rear frame portion is pivotable relative to the front frame portion about a vertical axis defined by the articulated joint;
a front wheel axle disposed on the front frame portion;
a rear wheel axle disposed on the rear frame portion;
an electric drive motor disposed on the rear frame portion and operably coupled to a first rear wheel and a second rear wheel disposed on the rear wheel axle in order to drive the first rear wheel and the second rear wheel; and
a battery system comprising a first battery and a second battery, the first and second batteries being electrically connected in series and collectively electrically coupled to a load comprising at least the electric drive motor,
wherein the first battery is disposed on the front frame portion between the front wheel axle and the articulated joint in an interior area of the front compartment; and
wherein the second battery is disposed on the rear frame portion completely rearward of the rear wheel axle and the electric drive motor, the second battery and electric drive motor are being disposed in an interior area of the drive motor compartment,
wherein the electric drive motor is disposed within the drive motor compartment, the drive motor compartment being disposed on the rear frame portion higher than a horizontal plane defined by the rear wheel axle.

15. The riding lawn mower of claim 14, wherein the load further comprises:
a cutting motor configured to drive a cutting blade, the cutting motor disposed forward of the front wheel axle.

16. The riding lawn mower of claim 14, further comprising:
a recharging receptacle operably coupled to the rear frame portion rearward of the second battery, wherein the recharging receptacle is located beneath a door hingedly coupled to a housing covering the second battery.

17. The riding lawn mower of claim 14, wherein a position of the first battery between the front wheel axle and the articulated joint and the second battery completely rearward of the rear wheel axle and the electric drive motor, balances the weight of the battery system across a frame comprising the front frame portion, the rear frame portion and the articulated joint.

18. The riding lawn mower of claim 14, wherein a longitudinal axis of the first battery is perpendicular to a longitudinal axis of the riding lawn mower.

19. The riding lawnmower of claim 14, wherein the electric drive motor is positioned substantially directly above the rear wheel axle.

20. The riding lawn mower of claim 14, further comprising:
a front wheel operably coupled to the front frame portion; and
wherein the riding lawn mower is configured to steer by pivoting the rear frame portion relative to the front frame portion about the articulated joint such that the first rear wheel and second rear wheel change orientation relative to the front wheel.

* * * * *

UNITED STATES PATENT AND TRADEMARK OFFICE
CERTIFICATE OF CORRECTION

| | |
|---|---|
| PATENT NO. | : 9,699,965 B2 |
| APPLICATION NO. | : 14/232318 |
| DATED | : July 11, 2017 |
| INVENTOR(S) | : Sebastian Schygge et al. |

It is certified that error appears in the above-identified patent and that said Letters Patent is hereby corrected as shown below:

Column 17, Claim 14, Line 40 "drive motor are being disposed in an interior area of the" should read ---drive motor being disposed in an interior area of the--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*